(12) United States Patent
Kim

(10) Patent No.: US 11,625,067 B2
(45) Date of Patent: Apr. 11, 2023

(54) MOBILE TERMINAL FOR DISPLAYING IMAGE AND CONTROL METHOD THEREOF

(71) Applicant: LG ELECTRONICS INC., Seoul (KR)

(72) Inventor: Changmok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 16/937,341

(22) Filed: Jul. 23, 2020

(65) Prior Publication Data

US 2021/0303027 A1 Sep. 30, 2021

(30) Foreign Application Priority Data

Mar. 31, 2020 (KR) .................. PCT/KR2020/004404

(51) Int. Cl.
G06F 1/16 (2006.01)
H04M 1/02 (2006.01)
G06F 3/01 (2006.01)
G06F 3/14 (2006.01)

(52) U.S. Cl.
CPC .......... *G06F 1/1624* (2013.01); *G06F 1/1652* (2013.01); *G06F 1/1686* (2013.01); *G06F 1/1694* (2013.01); *G06F 3/017* (2013.01); *G06F 3/14* (2013.01); *H04M 1/0264* (2013.01)

(58) Field of Classification Search
CPC ........... H04M 1/0264; H04M 1/72469; H04M 1/724
See application file for complete search history.

(56) References Cited

U.S. PATENT DOCUMENTS

| | | | |
|---|---|---|---|
| 10,860,274 B2 | 12/2020 | Son et al. | |
| 2013/0321340 A1* | 12/2013 | Seo | G06F 3/04842 345/174 |
| 2015/0015525 A1* | 1/2015 | Cho | G06F 1/1647 345/173 |
| 2019/0018454 A1 | 1/2019 | Jung et al. | |

FOREIGN PATENT DOCUMENTS

| | | |
|---|---|---|
| EP | 3742262 | 11/2020 |
| KR | 1020140108919 | 9/2014 |
| KR | 20160139643 | 12/2016 |
| KR | 20170062121 | 6/2017 |
| KR | 1020170086321 | 7/2017 |
| KR | 1020190001822 | 1/2019 |

OTHER PUBLICATIONS

PCT International Application No. PCT/KR2020/009111, International Search Report dated Dec. 24, 2020, 4 pages.

* cited by examiner

*Primary Examiner* — Edward Martello
(74) *Attorney, Agent, or Firm* — Lee, Hong, Degerman, Kang & Waimey PC

(57) ABSTRACT

Disclosed is a mobile terminal comprising a display including a first area and a second area, wherein the first area is located at a first side of the mobile terminal and the second area is located at a second side facing the first side, a camera disposed on the second side, and a controller, wherein the controller is configured to display an image acquired through the camera in the first area and the second area.

15 Claims, 23 Drawing Sheets

FIG. 2
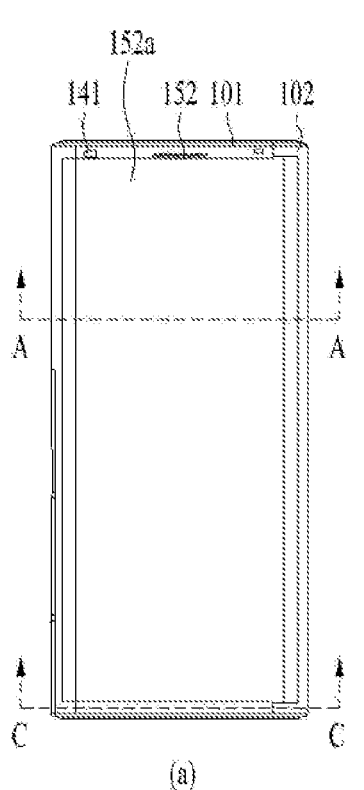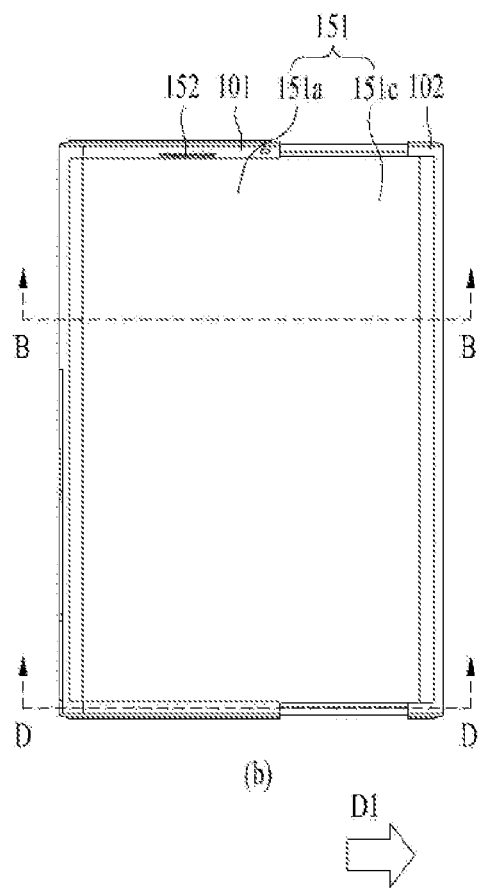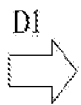

FIG. 6
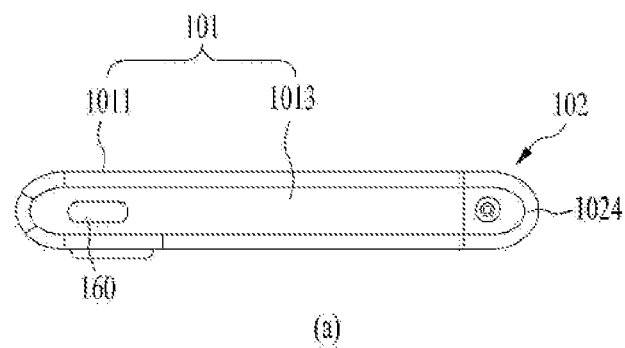
(a)
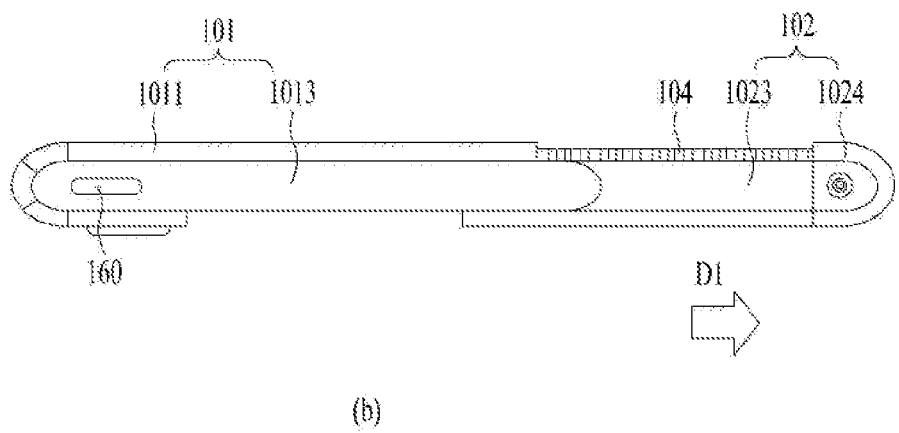
(b)

FIG. 7
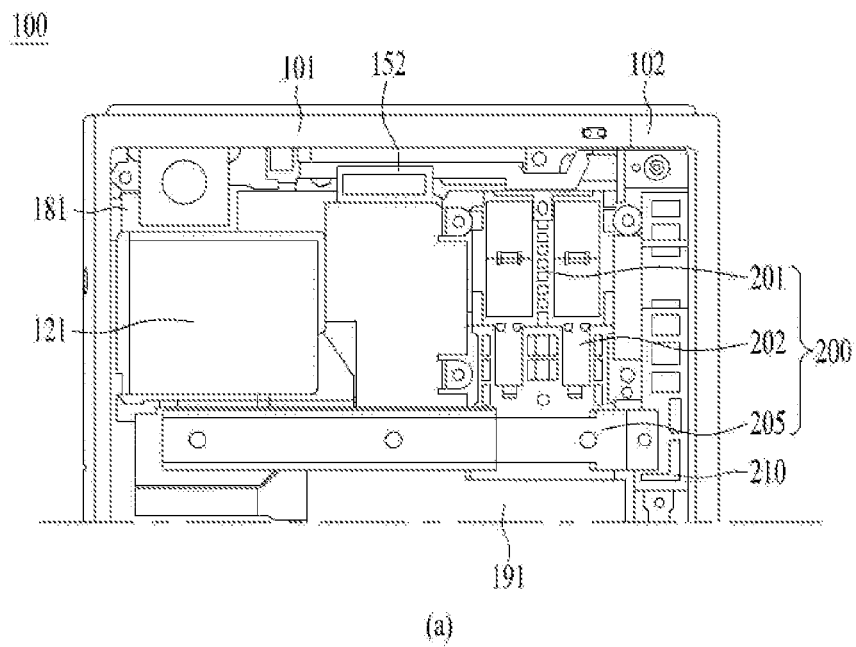
(a)
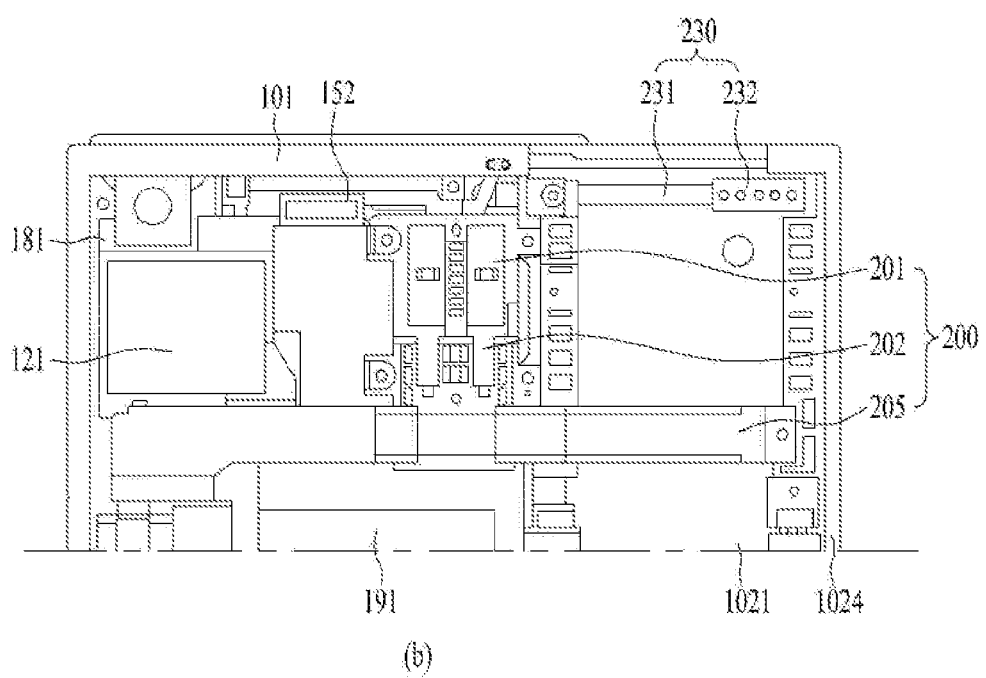
(b)

FIG. 8
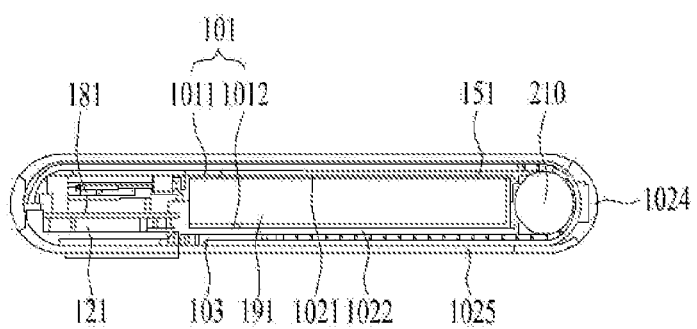
(a)
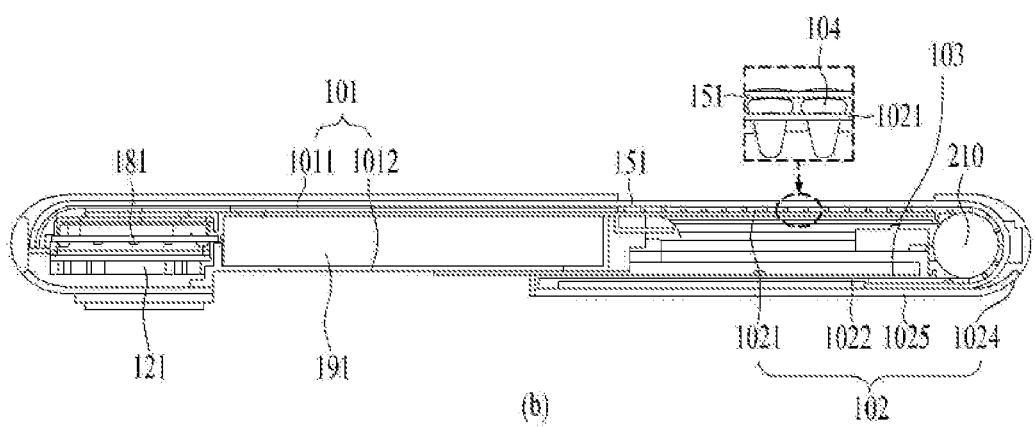
(b)

MOBILE TERMINAL FOR DISPLAYING IMAGE AND CONTROL METHOD THEREOF

CROSS-REFERENCE TO RELATED APPLICATION

Pursuant to 35 U.S.C. § 119 (a), this application claims the benefit of an earlier filing date and right of priority to International Application No. PCT/KR2020/004404 filed on Mar. 31, 2020, the contents of which are hereby incorporated by reference herein in its entirety.

BACKGROUND

1. Field

This disclosure relates to a mobile terminal for displaying an image using at least one of a first side and a second side of the mobile terminal and a control method thereof. One particular implementation relates to a mobile terminal for displaying an image on a first side and a second side based on a condition of the mobile terminal and a control method thereof.

2. Description of the Related Art

Advances of network technologies and expansions of infrastructures have enabled an electronic device to perform various and professional tasks. In this regard, there has been an increasing desire for an electronic device with a display that displays content on a large screen.

However, a display providing a large screen may increase in size in proportion to a screen size. Thus, it is necessary to consider a portability along with a size of the display in terms of an electronic device of which the portability is emphasized, such as a mobile terminal.

For this, there can be considered a method to change a size of a display as necessary by applying a foldable or rollable display having a sufficient elasticity to the electronic device. For example, a portion of a display may be rolled up to a rear side of a mobile terminal, and rolled out or moved as necessary such that an exposed area of the display increases.

When the display is provided to have the portion rolled up to the rear side of the mobile display, the display may be located at each of a front side and the rear side of the mobile display. When a user grips and uses the mobile terminal with one hand or both hands, inputs may be simultaneously applied to the front side and the rear side of the mobile terminal. In this case, touch inputs may be recognized by simply the gripping motion, which may unintentionally lead to a touch error. Therefore, there is a desire for a method to effectively control an operation related to the display in consideration of a usage pattern of the mobile terminal when the display is provided at each of the front side and the rear side.

SUMMARY

An aspect provides a mobile terminal and a control method of the mobile terminal to control input sensing for at least one of a front side and a rear side of a display based on a use pattern of the mobile terminal, thereby preventing a false operation which may occur due to an input to the mobile terminal.

Technical goals of the present disclosure are not limited as mentioned above and, although not mentioned, may include goals that can be clearly understood by those skilled in the art to which the present disclosure pertains, from the following description.

According to an aspect, there is provided a mobile terminal comprising a display including a first area and a second area, wherein the first area is located at a first side of the mobile terminal and the second area is located at a second side facing the first side, a camera disposed on the second side, and a controller, wherein the controller is configured to display an image acquired through the camera in the first area and the second area.

According to another aspect, there is also provided a method of controlling a mobile terminal that comprises a display includes a first area and a second area wherein the first area is located at a first side of the mobile terminal and the second area is located at a second side facing the first side and a camera disposed on the second side. The method includes acquiring an image through the camera and displaying the acquired image in the first area and the second area.

BRIEF DESCRIPTION OF THE DRAWINGS

The above and other aspects, features, and advantages of certain embodiments will be more apparent from the following detailed description taken in conjunction with the accompanying drawings, in which:

FIG. 2 illustrates front views of a mobile terminal in a first state and a second state according to an example embodiment;

FIG. 6 illustrates side views of a mobile terminal from a third direction according to an example embodiment;

FIG. 7 illustrates a driving part of a mobile terminal according to an example embodiment;

FIG. 8 illustrates cross-sectional views taken along lines A-A and B-B of FIG. 2;

DETAILED DESCRIPTION

Figure 1:
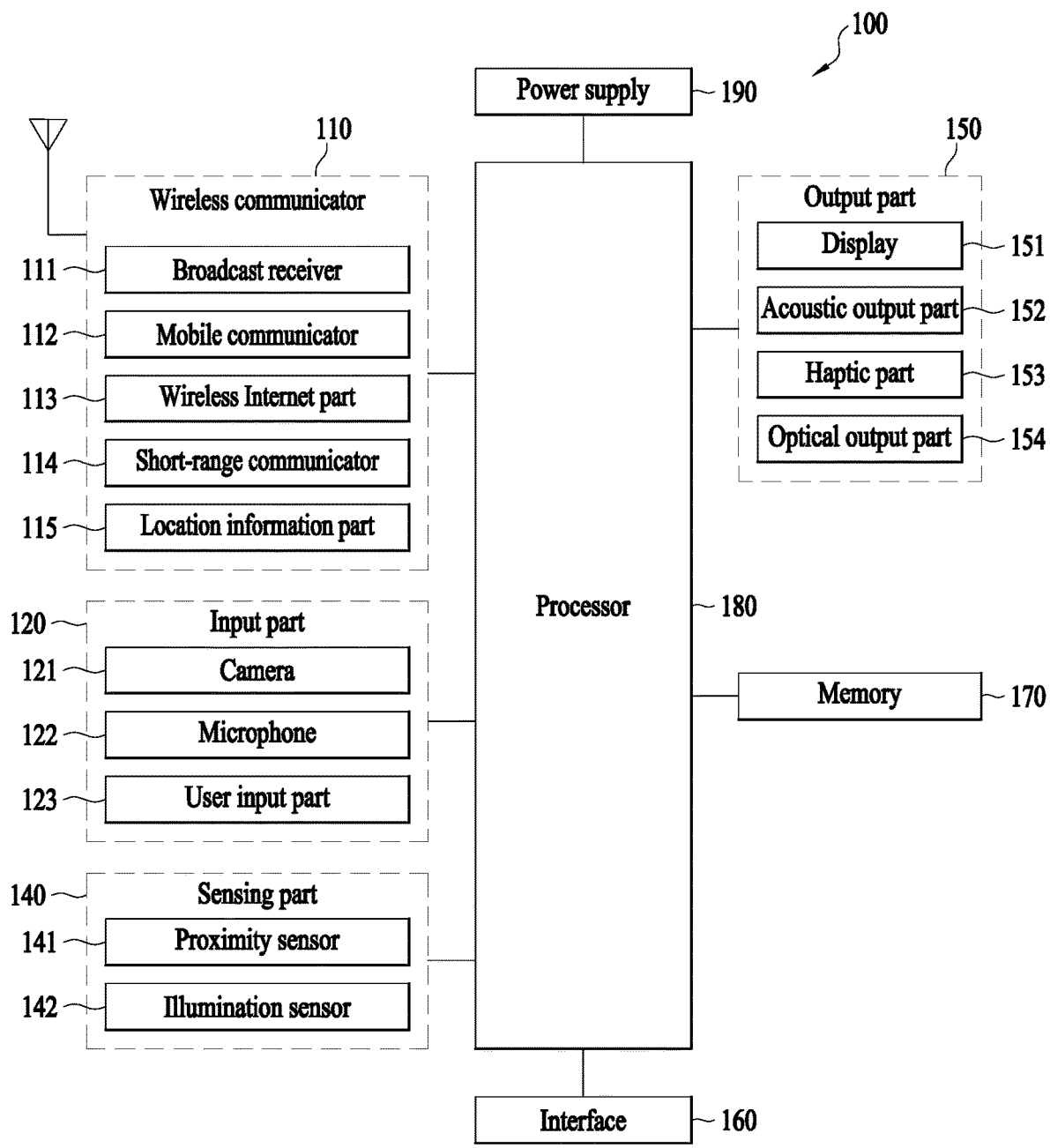
FIG. 1 is a block diagram illustrating a mobile terminal.

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. It should be understood, however, that there is no intent to limit this disclosure to the particular example embodiments disclosed. Further, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIG. 1 is a block diagram illustrating a mobile terminal (or electronic device) 100 related to an example embodiment of the present disclosure. The mobile terminal 100 may include a wireless communication part 110, an input part 120, a sensing part 140, an output part 150, an interface 160, a memory 170, a controller (or processor) 180, and a power supply 190. The components illustrated in FIG. 1 are not essential to implementing the electronic apparatus, so the mobile terminal 100 described herein may have more or fewer components than those listed above.

Specifically, the wireless communication part 110 may include at least one module that enables wireless communication to be performed between the mobile terminal 100 and a wireless communication system, between the mobile terminal 100 and another mobile terminal 100, or between the mobile terminal 100 and an external server. The wireless communication part 110 may include one or more modules that connect the mobile terminal 100 to one or more networks.

The wireless communication part 110 may include at least one of a broadcast receiver 111, a mobile communication part 112, a wireless Internet part 113, a short-range communication part 114, and a position information part 115.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The sensing part 140 may include one or more sensors to sense at least one of information in the mobile terminal, surrounding environment information of the mobile terminal, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the mobile terminal may use a combination of pieces of information sensed in at least two sensors among the aforementioned sensors.

The output part 150 may generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may also function as the user input part 123 that provides an input interface between the mobile terminal 100 and a user and simultaneously, provide an output interface between the mobile terminal 100 and the user.

The interface 160 may function as a passage to various types of external devices connected to the mobile terminal 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the mobile terminal 100 may perform an appropriate control associated with the connected external device.

The memory 170 may store data supporting various functions of the mobile terminal 100. The memory 170 may store application programs (or applications) run in the mobile terminal 100, data for operation of the mobile terminal 100, and instructions. At least a portion of the application programs may be downloaded from an external server through wireless communication. Also, at least a portion of the application programs may exist in the mobile terminal 100 for a basic function (for example, call forwarding and outgoing function and message receiving and outgoing function) of the mobile terminal 100 from the time of manufacture. The application program may be stored in the memory 170, installed in the mobile terminal 100, and run by the controller 180 to perform an operation (or function) of the mobile terminal.

The controller 180 generally controls an overall operation of the mobile terminal 100 in addition to operations related to the application programs. The controller 180 may process a signal, data, information, and the like input or output through the aforementioned components or run the application program stored in the memory 170, thereby providing information to a user or performing appropriate information or function.

Also, to run the application program stored in the memory 170, the controller 180 may control at least a portion of the components shown in FIG. 1. Furthermore, to run the application program, the controller 180 may operate a combination of two or more components among the components included in the mobile terminal 100.

The power supply 190 may supply power to each component included in the mobile terminal 100 by receiving external or internal power under a control of the controller 180. The power supply 190 may include a battery such as a built-in battery or a removable battery.

At least a portion of the aforementioned components may operate in cooperation with each other to implement an operation, a control, or a control method of the mobile terminal according to various embodiments as described below. Also, the operation, control, or control method of the mobile terminal may be implemented on the mobile terminal through an execution of at least one application program stored in the memory 170.

Figure 3:
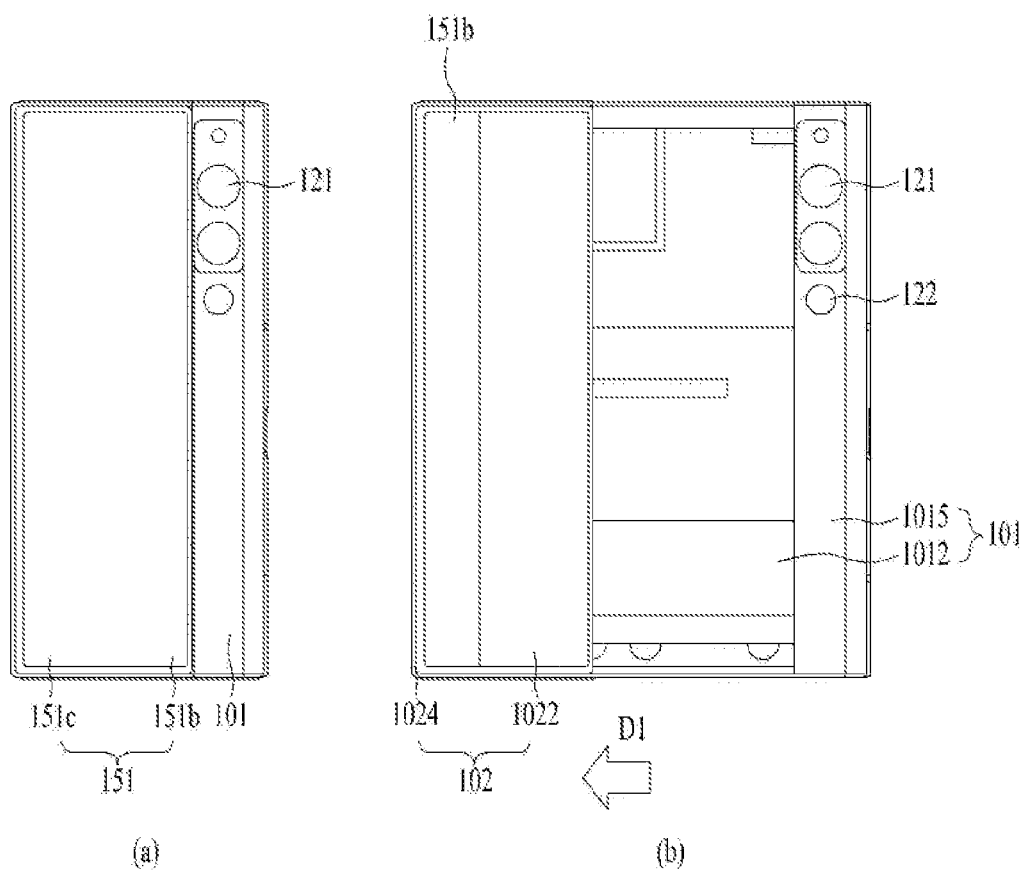
FIG. 3 illustrates rear views of a mobile terminal in a first state and a second state according to an example embodiment.

FIG. 2 illustrates front views of a mobile terminal in a first state and a second state, and FIG. 3 illustrates rear views of the mobile terminal in the first state and the second state. (a) of FIG. 2 and (a) of FIG. 3 illustrate the first state in which the mobile terminal is retracted. (b) of FIG. 2 and (b) of FIG. 3 illustrate the second state in which the mobile terminal is extended.

As illustrated, the mobile terminal 100 in the first state is retracted and has a smaller size when compared to the mobile terminal 100 in the second state. Also, in the first state, a display part or display 151 located at a front side of the mobile terminal 100 may be reduced in size when compared to the second state. The mobile terminal 100 may be extended in a first direction D1 in the first state to enter the second state. In the second state, as shown in (b) of FIG. 2, the size of the mobile terminal 100 and the size of the display 151 located at the front side may increase when compared to the first state. Also, in the second state, the size of the display 151 located at a rear side may be reduced as shown in (b) of FIG. 3. In other words, a display's portion located at the rear side of the mobile terminal 100 in the first state may move to the front side of the mobile terminal 100 in the second state.

In the following description, a direction in which the mobile terminal 100 and the display 151 thereof are extended or enlarged may be referred to as the first direction D1. In addition, a direction in which the mobile terminal 100 and the display 151 thereof are contracted, retracted, or reduced in the second state to enter the first state may be referred to as a second direction D2. Also, a direction vertical to the first direction D1 and the second direction D2 may be referred to as a third direction. The following description may be based on a case in which the first direction and the second direction are horizontal directions and the third direction is a vertical direction. In some cases, based on a placement of the mobile terminal 100, the first direction D1 and the second direction D2 may be vertical directions and the third direction may be a horizontal direction.

The display 151 may use the flexible display 151 to be bent so that a position of the display 151 is changeable. The flexible display 151 may be maintained in a flat state like a typical flat panel display and include a display (e.g., electronic paper) to be curved, bent, folded, twisted, or rolled like a paper. Also, the flexible display 151 may include a lightweight and durable display fabricated on a thin and flexible substrate. The flexible display 151 may be bendable in a predetermined direction like a paper and disposed such that a curvature is changed in the first direction.

The electronic paper may be a display technology based on characteristics of a general ink, and different from the typical flat panel display in using reflected light. The electronic paper may use a twist ball or electrophoresis using a capsule to change information.

In a state in which the flexible display 151 is not deformed (for example, a state having an infinite curvature radius, hereinafter, referred to as a default state), a display area of the flexible display 151 may be a plane. In the default state, when the flexible display 151 is deformed by an external force (for example, a state having a limited curvature radius, hereinafter, a deformed state), the display area may be a curved plane. As illustrated, information displayed in the deformed state may be visual information displayed on the curved plane. The visual information may be implemented by individually controlling light emission of sub-pixels arranged in a matrix form. The sub-pixel may be a minimum unit for implementing one color. When the external force is applied to the flexible display 151, the flexible display 151 may be changed from a flat state which is the default state to a curved state.

The flexible display 151 may implement a flexible touch screen in combination with a touch sensor. In response to a touch being input to the flexible touch screen, the controller 180 of FIG. 1 may perform a control corresponding to the touch input. The flexible touch screen may be configured to sense a touch input even in the deformed state as well as the default state.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The mobile terminal 100 may include a deformation detection means that detects a deformation of the flexible display 151. The deformation detection means may be included in the sensing part 140 of FIG. 1.

The deformation detection means may be provided in the flexible display 151 or a case (a first frame 101 and a second frame 102 described below) to sense information related to the deformation of the flexible display 151. The information related to the deformation may include, for example, a direction in which the flexible display is deformed, a degree of deformation, a deformed position, a deformation time, and an acceleration at which the deformed flexible display 151 is restored. In addition, the information related to the deformation may be various information to be detected in response to the flexible display 151 being bent.

Also, based on the information related to the deformation of the flexible display 151 detected by the deformation detection means, the controller 180 may change information displayed on the flexible display 151 or generate a control signal for controlling functions of the mobile terminal 100.

The deformation of the flexible display 151 may vary based on positions of the first frame 101 and the second frame 102. As illustrated in FIG. 2, since a bent position of the flexible display 151 is determined based on the positions of the first frame 101 and the second frame 102, a front-side exposed area and a bending-deformed position of the flexible display 151 may be calculated based on the positions of the first frame 101 and the second frame 102 instead of the deformation detection means of the flexible display 151.

A state change (to the first state or the second state) of the flexible display 151, for example, a size change of the display 151 occurring at the front side or the rear side of the mobile terminal 100 in response to a size change of the mobile terminal 100 may be manually performed by force applied by a user but not be limited to such a manual manner. For example, when the mobile terminal 100 or the flexible display 151 is in the first state, the mobile terminal 100 or the flexible display 151 may be changed to enter the second state by a command of the user or an application irrespective of the external force applied from the user. To automatically deform the flexible display 151 without applying the external force, the mobile terminal 100 may include a driving part 200 described below.

The flexible display 151 may be rolled and bent 180° with covering a first-direction side portion of the mobile terminal 100. Based on the side portion of the mobile terminal 100, a portion of the flexible display 151 may be located at the front side of the mobile terminal 100 and another portion of the flexible display 151 may be located at the rear side of the mobile terminal 100. For ease of description, the flexible display 151 located at the front side may be referred to as a front-side portion and the flexible display 151 located at the rear side may be referred to as a rear-side portion. The mobile terminal may extend in the first direction or retract in the second direction opposite to the first direction as illustrated in FIG. 2. In this case, an area of the flexible display 151 located at the front side may be changed. In other words, sizes of the front-side portion and the rear-side portion may be changed based on a state change of the mobile terminal.

A portion of the flexible display 151 located at the front side of the mobile terminal 100 may be unmovably fixed to a front side of the first frame 101 while another portion located at the rear side of the mobile terminal 100 is movably provided at the rear side.

The flexible display 151 may be rolled or released at a first-direction side portion of the mobile terminal 100. In this case, a portion located at the rear side of the mobile terminal 100 may be moved to adjust a size of an area of the flexible display 151 located at the front side of the mobile terminal 100. Since the area of the flexible display 151 is set and the flexible display 151 is configured as one continuous body, an area of the rear-side portion may be reduced when an area of the front-side portion is increased. The display 151 may be rolled in the second frame 102 that is movable relative to the first frame 101, for example, on a first-direction side portion of the second frame 102. Also, in order to adjust the area of the display 151 at the front side of the mobile terminal 100, the display 151 may be inserted or pushed into the second frame 102 or withdrawn or pulled out from the second frame 102 while being rolled up at the second frame 102 based on a moving direction of the second frame 102. Such operation will be further described below along with other related components of the mobile terminal 100.

In general, an antenna may be provided in a case or a housing of the mobile terminal 100. However, due to the flexible display 151 that covers the mobile terminal 100 from the front surface to a rear surface thereof, a part for mounting the antenna in the case or housing may be restricted. For this reason, the antenna may be embodied on the flexible display 151. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance. Also, the AOD may transmit or receive a signal directly to or from the display 151. Thus, the AOD may be used in the mobile terminal 100 in which the display 151 is located at both sides as described in the present disclosure.

Figure 4:
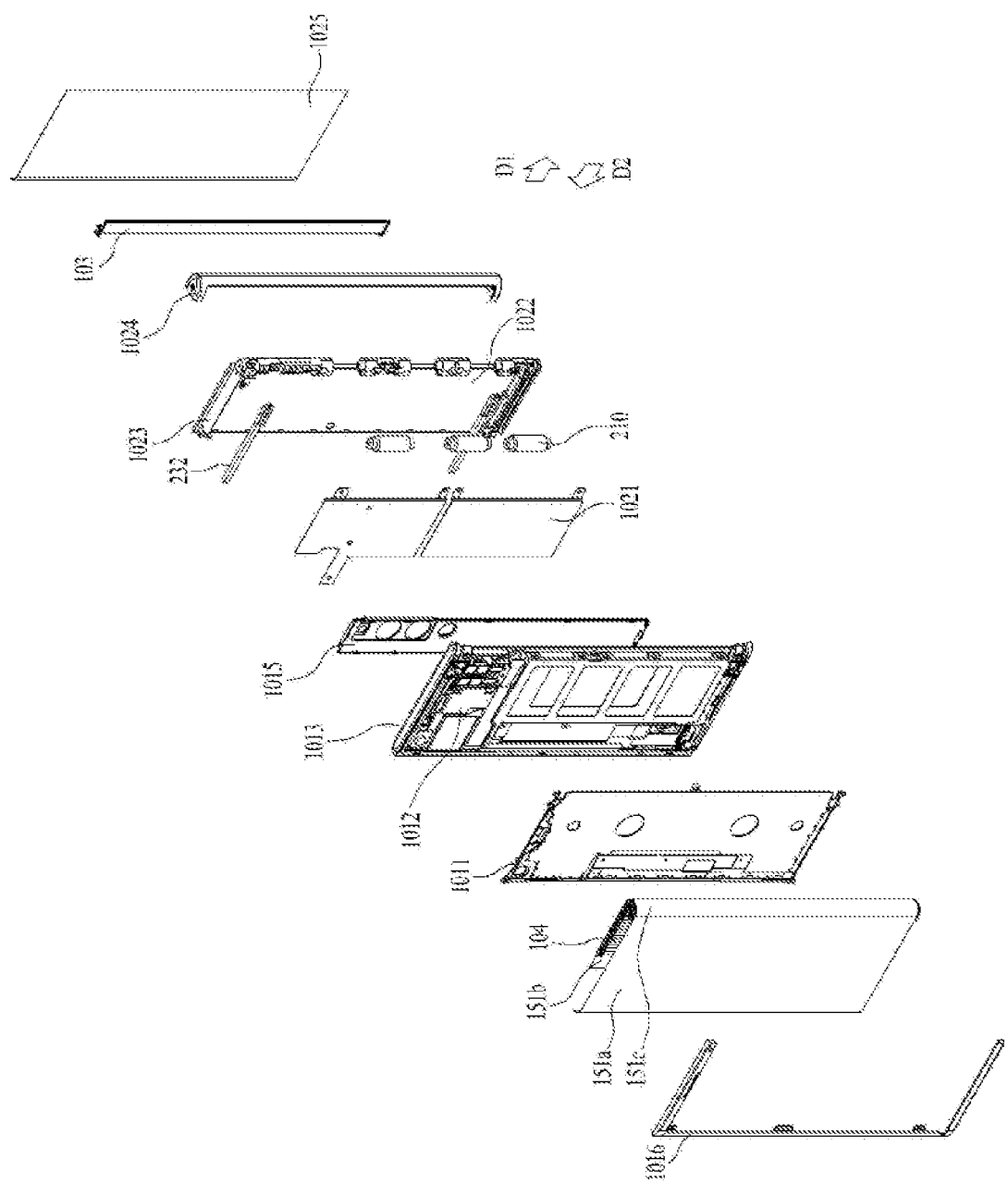
FIGS. 4 and 5 are exploded perspective views illustrating a mobile terminal according to an example embodiment.
Figure 5:
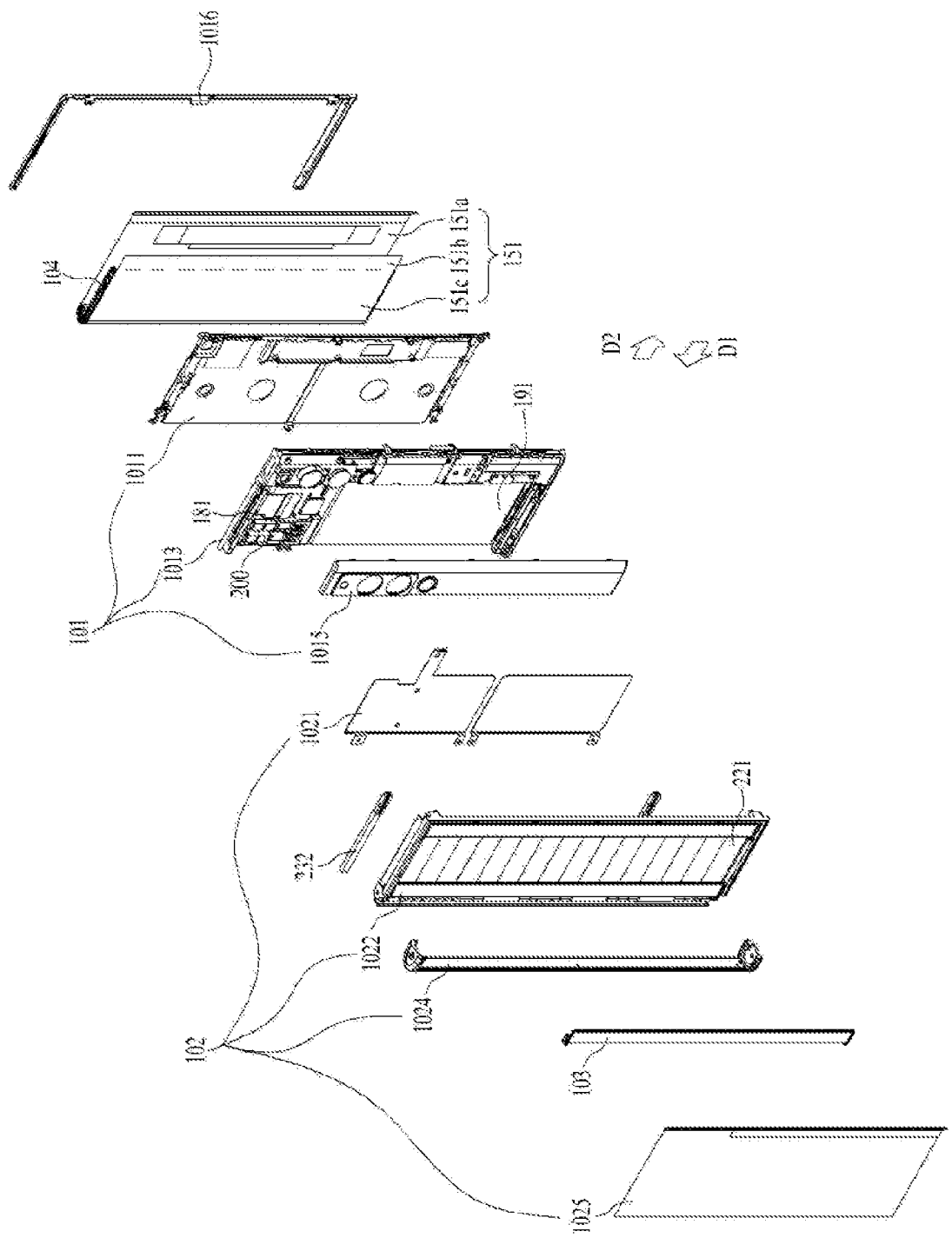

FIGS. 4 and 5 are exploded perspective views illustrating a mobile terminal according to an example embodiment. Specifically, FIG. 4 is an exploded perspective view illustrating a mobile terminal from a front-side direction and FIG. 5 is an exploded perspective view illustrating the mobile terminal from a rear-side direction.

The mobile terminal 100 of the present disclosure may include a frame, for example the first frame 101 and the second frame 102 to mount components therein. As illustrated in FIG. 2, the frame may be changed in size in the first direction. At least one frame may relatively move so as to be changed in size in the first direction. The frame may include an electronic component mounted therein. Also, the flexible display 151 may be located external to the frame.

Since the mobile terminal 100 of the present disclosure includes the flexible display 151, the flexible display 151 may be coupled in a form of covering a front side and a rear side of the frame. The frame may include the first frame 101 and the second frame 102 that moves relative to the first frame 101 in the first direction. The first frame 101 and the second frame 102 may each include a front portion, a rear portion, and a side portion and may be coupled to each other.

The first frame 101 may correspond to a main body of the mobile terminal 100 and have a space for accommodating components between a first front portion 1011 and a first rear portion 1012. Also, the first frame 101 may accommodate, in the space, the second frame 102 that is movably coupled to the first frame 101. Specifically, as illustrated in FIGS. 2 and 5, the first frame 101 may include the first front portion 1011 that is disposed in the front of the mobile terminal 100 to support the front-side portion of the display 151 and the first rear portion 1012 that is disposed in the rear of the mobile terminal 100 so that various components are mounted therein.

The first front portion 1011 and the first rear portion 1012 may be separated in a predetermined distance such that a predetermined space is formed therebetween. Also, the first front portion 1011 and the first rear portion 1012 may be connected by a first side portion 1013. The first side portion 1013 may be integrally formed with the first rear portion 1012 or the first front portion 1011. The camera 121, the acoustic output part 152, an input and output terminal, the controller 180, and the power supply 190 may be accommodated in the space of the first frame 101 as components of the mobile terminal 100. For example, the controller 180 may be a circuit board 181 including an electric circuit and a processor provided to control an operation of the mobile terminal 100. In addition, the power supply 190 may be a battery 191 and related components. Also, the below-described driving part 200 that controls a slide movement of the second frame 102 may be accommodated in the first frame 101.

As described above, the display 151 may have a continuous body and rolled in the mobile terminal 100 to be located both front side and rear side of the mobile terminal 100. The display 151 may include a front-side portion located at the front side of the mobile terminal 100, a rear-side portion located at the rear side of the mobile terminal 100, and a side portion located between the front-side portion and the rear-side portion to cover a side surface of the mobile terminal 100. The front-side portion and the rear-side portion of the display 151 may be flat and the side portion of the display 151 may be curved. When the side portion is bent to form an angle, the flexible display 151 may be damaged. Thus, the side portion may be provided to be bent with a predetermined curvature.

The display 151 may include a fixed portion and a variable portion. The fixed portion may be a portion fixed to a frame. Since the fixed portion is fixed at the frame, a bending degree of the fixed portion may not be changed so that the fixed portion is maintained in a predetermined shape. The variable portion may be a portion in which an angle or position of a bent portion is changeable. The variable portion may require a structure for supporting a rear surface of the variable portion in in accordance with a change in angle or position of the bent portion.

The fixed portion may be coupled to the first frame 101 of the display 151 and located at the front side so as to be a part of the front-side portion. The variable portion may include a side portion located in a direction to a side surface of the mobile terminal. In this case, a position of the side portion may be changed based on a position of the second frame 102. An area located at the front side and an area located at the rear side may be changed in size based on the side portion. For example, based on whether being in the first state or the second state, a portion of the variable portion may be the front-side portion and another portion may be the rear-side portion. The variable portion may be located in the first direction with respect to the fixed portion (e.g., a first area 151*a* and a second area 151*b*) based on the mobile terminal 100. An end portion of the variable portion may be bent in a direction to the rear side of the mobile terminal 100 and slidably move on the rear side of the second frame 102.

The end portion of the variable portion of the display 151 may be coupled to a sliding frame 103 that guides the end portion to slide on the rear side of the second frame. The sliding frame 103 may move on the second frame 102 in the first direction simultaneously when the second frame 102 moves in the first direction. As a result, the sliding frame 103 may move relative to the first frame 101 by a distance twice that of the second frame 102. Referring to FIG. 3, the first rear portion 1012 of the mobile terminal 100 may include an exposed rear portion 1015 that is not covered by the display 151 and is exposed outside even in the first state. In the exposed rear portion 1015, various buttons for manipulating the mobile terminal 100, switches, the camera 121, the physical input part 120 such as a flash, and the sensing part 140 such as the proximity sensor 141 and a fingerprint sensor may be arranged. The first rear portion 1012 except the exposed rear portion 1015 may be covered by display 151 in the first state as shown in (a) of FIG. 3 and exposed in the rear-side direction in the second state as shown in (b) of FIG. 3.

A typical bar-type terminal may provide a display on only a front side of the terminal. In such terminal, a main camera may be mounted on a rear side of the terminal to allow a user to capture an object facing a side opposite to the display while the user is viewing the object through the display. To allow the user to capture himself or herself while viewing through the display, another camera may be additionally required on a front side of the terminal.

In the present disclosure, the display 151 may be located at both front side and rear side of the mobile terminal 100. When the user captures himself or herself, the display 151 on the same side as the camera 121, that is, the rear-side portion of the display 151 may be used. When the user captures an object facing the side opposite to the user, the front-side portion of the display 151 located on the side opposite to the camera 121 may be used. Through this, the mobile terminal 100 may capture the user and the object facing the side opposite to the user using the single camera 121. The camera 121 may include a plurality of cameras having different angles of view such as a wide angle, an ultra-wide angle, a telephoto, and the like. In addition to the camera 121, a proximity sensor, an acoustic output part, and the like may be located on the exposed rear portion 1015. Also, the antenna 116 may be installed thereto. In view of exterior design, an exposure decoration may be attached to protect the camera and sensor of the exposed rear portion 1015. In the exposure decoration, a portion corresponding to the camera 121 or the sensing part 140 may be configured to be transparent and another portion may have a predetermined pattern or color in consideration of design so internal components are not be exposed.

The first side portion 1013 may extend along edges of the first front portion 1011 and the first rear portion 1012 to cover a perimeter of the first frame 101 and form an appearance of the mobile terminal 100. As described above, since the second frame 102 is accommodated in the first frame 101 and movably coupled thereto, a portion of the first frame 101 may be open to allow a relative movement of the second frame 102 with respect to the first frame 101.

Referring to FIG. 2, because the second frame 102 is movably coupled to the first frame 101 in the first direction, the first side portion 1013 may not be formed on the first-direction side surface and thus, may be open. Since the first side portion 1013 is exposed external to the mobile terminal 100, the interface 160 for connecting a power port or an ear jack, or the user input part 120 such as a volume button may be disposed therein. When including a metal material, the first side portion 1013 may serve as an antenna.

The second frame 102 may include a second front portion 1021 located in the front of the mobile terminal 100 and a second rear portion 1022 located in the rear of the mobile terminal 100. Like the first front portion 1011 and the first rear portion 1012 of the first frame 101, the second front portion 1021 and the second rear portion 1022 may be formed as substantially flat panel members. The second frame 102 may accommodate various components and may not interfere with the components accommodated in the first frame 101 during the movement. The second front portion 1021 and the second rear portion 1022 may be coupled to each other so that a predetermined space is formed therebetween. Also, the second front portion 1021 and the second rear portion 1022 may be shaped not to interfere with the components included in the first frame 101.

FIG. 6 illustrates side views of the mobile terminal 100 from the third direction. FIG. 6 illustrates the first side portion 1013 of the first frame 101 and a second side portion 1023 of the second frame 102. A first-direction end portion of the second frame 102 may not be exposed outside since the flexible display 151 is located. Also, a second-direction end portion of the second frame 102 may be open to prevent interference with the first frame 101. The second side portion 1023 of the second frame 102 located in the third direction (in the drawings, an upper or lower direction or including both upper and lower directions) may overlap the first side portion 1013 of the first frame 101 not to be exposed outside in the first state. In the second state, however, the second side portion 1023 may be exposed outside because the second frame 102 is pulled out.

The display 151 may be rolled in the second frame 102 and bent at 180° so as to be located at both front and rear sides of the mobile terminal 100. For such arrangement of the display 151, the second frame 102 may include a roller 210 rotatably disposed therein. The roller 210 may be disposed at a predetermined position in the second frame 102. To provide a high-quality display to a user, the display 151 may be flatly spread on the front side and the rear side of the mobile terminal 100. For this, a sufficient tensile force may be provided to the display 151. To provide the sufficient tensile force, the roller 210 may be disposed at the first-direction end portion of the second frame 102. The roller 210 may be extended in the second direction and rotatably coupled to the second frame 102.

The display 151 may be gently bent with a predetermined curvature to be rolled on the roller 210. The flexible display 151 may include a first surface exposed outside to display an image and an inner surface facing a frame on the other side. The roller 210 may be installed in the second frame 102 to be freely rotatable while contacting the inner surface of the display 151. Practically, the roller 210 may move the display 151 in a lateral direction, that is, a direction vertical to a longitudinal direction of the mobile terminal 100. As described below, when the second frame 102 slides, the display 151 having a direction (e.g., the first direction D1 or the second direction D2) different from and relative to the second frame 102 may be moved to the front side or the rear side of the mobile terminal 100 by the tensile force applied from the second frame 102. In this instance, the roller 210 may guide the movement of the display 151 while rotating.

The roller 210 may be disposed adjacent to the first-direction end portion of the second frame 102 and include a side frame 1024 disposed at the first-direction end portion of the second frame 102 to prevent damage to the display 151 rolled on the roller 210.

The side frame 1024 may extend in the longitudinal direction of the second frame 102 (e.g., the third direction) to cover the first-direction side portion, so as to protect the roller 210 and the display 151 rolled thereon. Also, the side frame 1024 may be relocated based on a state of the mobile terminal 100. The side portion may have a predetermined curvature and be rolled by the roller 210. An inner surface of the side frame 1024 may include a curved surface corresponding to the curvature of the side portion.

The side frame 1024 may substantially form an appearance of the mobile terminal 100 along with the first side portion 1013 of the first frame 101. Also, to minimize interference with the components of the first frame 101 during the movement, a second-direction side portion of the second frame 102 may be omitted.

During expansion and retraction in the first direction D1 and the second direction D2, the second frame 102 may overlap the first frame 101, for example, the first front portion 1011 and the first rear portion 1012 of the first frame 101 to prevent the interference with the first frame 101. Specifically, as described above, the display 151 may be coupled to the first front portion 1011 of the first frame 101 and supported by the first front portion 1011. Thus, the display 151 may not be additionally supported by the second front portion 1021 of the second frame 102.

When the second front portion 1021 is located between the first front portion 1011 and the display 151, the display 151 may be deformed or damaged due to a friction with the second front portion 1021 moving repetitively. To prevent this, the second front portion 1021 may be disposed below the first front portion 1011 or inserted between the first front portion 1011 provided as two pieces. The second rear portion 1022 of the second frame 102 may be disposed in a rear-side direction of the first rear portion 1012 of the first frame 101. For example, a front side of the second rear portion 1022 may face a rear side of the first rear portion 1012. Also, to stably support a motion of the second frame 102, the rear side of the first rear portion 1012 may contact the front side of the second rear portion 1022. In such arrangement, the second rear portion 1022 may be exposed external to the first frame 101, for example, external to the first rear portion 1012 and coupled to the display 151.

The second frame 102 may extend and retract in the first and second directions D1 and D2 such that a size of the mobile terminal 100, for example, a size of the front side of the mobile terminal 100 is increased or reduced. In this instance, to obtain the intended first and second states, the display 151 may be moved based on the increased or reduced portion of the front side. When the display 151 is fixed to the second frame 102, the display 151 may not be moved in response to the front side of the mobile terminal 100 being extended or retracted. For this reason, the display 151 may be movably coupled to the second frame 102.

Specifically, the display 151 may include the first area 151*a* located at the front side of the mobile terminal 100 and the second area 151*b* coupled to the sliding frame 103 located at the rear side of the mobile terminal 100. The display 151 may also include a third area 151*c* located between the first area 151*a* and the second area 151*b*. The third area 151*c* may be bent to cover the roller 210 and may move to the front side or the rear side based on a state change of the mobile terminal 100. The sliding frame 103 may be provided as a panel-type member that extends in the longitudinal direction of the mobile terminal 100 (e.g., the third direction) and may be coupled to the second rear portion 1022 to be movable in the first direction D1 and the second direction D2.

The first area 151*a*, the second area 151*b*, and the third area 151*c* may be connected to one another and form a continuous body of the display 151. Also, as described above, to allow the third area 151*c* to move to the front side or the rear side of the mobile terminal 100 based on a moving direction of the second frame 102, the first area 151*a* may be unmovably fixed to the front side of the mobile terminal 100 and the second area 151*b* may be movably provided on the rear side of the mobile terminal 100. Such configuration of the display 151 will be described in detail below.

The first area 151*a* may be located at the front side of the mobile terminal 100, for example, the front side of the first front portion 1011 of the first frame 101. The first area 151*a* may be fixed to the front side of the first frame 101, for example, the front side of the first front portion 1011 so as not to move even when the second frame 102 moves.

Through this, the first area 151a may always be exposed at the front side of the mobile terminal 100.

The third area 151c may be adjacent to the first area 151a. The third area 151c may extend into the second frame 102 to be rolled on the roller 210. Continually, the third area 151c may extend out of the second frame 102 and partially cover the second frame 102, for example, the rear side of the second rear portion 1022. Meanwhile, since the second frame 102, that is, the second rear portion 1022 is adjacent to the first frame 101, for example, the first rear portion 1012 and forms a rear case of the mobile terminal 100 together, it can be understood that the third area 151c is also arranged at the rear side of the first frame 101.

The second area 151b may be adjacent to the third area 151c and located at the rear side of the mobile terminal 100, for example, the rear side of the second rear portion 1022 of the second frame 102. The second area 151b may be coupled to the sliding frame 103 instead of being coupled directly to the second frame 102.

As a result, the first area 151a may be located at the front side of the mobile terminal 100 to be always exposed at the front side irrespective of the movement of the second frame 102. Also, the second area 151b may be located at the rear side of the mobile terminal 100 to be always exposed at the rear side irrespective of the movement of the second frame 102. The third area 151c may be between the first and second areas 151a and 151b and selectively arranged at the front side or the rear side of the mobile terminal 100 based on the moving direction (e.g., D1, D2) of the second frame 102.

In such a selective arrangement of the third area 151c, since the third area 151c moves to the front side of the mobile terminal 100 and the second rear portion 1022 moves in the first direction D1 in the second state, a first rear portion 1012's portion which is covered by the second area 151b and the third area 151c of the display 151 and the second rear portion 1022 in the first state may be exposed external to the mobile terminal 100. Also, in the first state, the second front portion 1021 of the second frame 102 may be disposed hidden by the first front portion 1011 of the first frame 101. In the second state, however, the second front portion 1021 may be moved out of the first frame 101 to support the third area 151c of the display 151 located at the front side of the mobile terminal 100.

A separating plate may be further provided to prevent the second front portion 1021 from affecting inside components during the sliding movement. The separating plate may be located in a rear-side direction of the second front portion 1021 and coupled to the first front portion 1011. The second front portion 1021 may move between the first front portion 1011 and the separating plate in response to the slide movement of the second frame 102.

The third area 151c may be rolled on the roller 210 in the second frame 102 to be curved. When the first state is changed to the second state, the third area 151c may extend from the second frame 102 to the front side of the mobile terminal 100 while being rolled on the roller 210 in one direction. When the second state is changed to the first state, the third area 151c may be rolled on the roller 210 in a reverse direction to retract from the front side of the mobile terminal 100 to the second frame 102. Simultaneously, the third area 151c may return from the second frame 102 to the rear side of the mobile terminal 100.

An opening-book-type foldable mobile terminal may be repetitively folded at a predetermined position and thus, easily damaged at the position. In contrast, a deformed portion of the flexible display 151, that is, a portion to be rolled on the roller 210 may vary based on the first and second state of the mobile terminal 100, that is, the movement of the second frame 102. As such, the mobile terminal 100 of the present disclosure may significantly reduce deformation and fatigue repetitively applied to a predetermined portion of the display 151 so that the damage to the display 151 is prevented.

Based on the above-described configuration, an overall operation of the mobile terminal 100 will be described as follows. In one example, a state transition may be performed manually by a user, and an operation of the mobile terminal 100 performed during such a manual state transition will be described. However, the below-described operations of the first to third frames 101 to 103 and the display 151 may be equally performed even when a power source other than user's power is used, for example, the driving part 200 is applied as described later.

A rear cover 1025 may be further provided on the rear side of the second rear portion 1022 to prevent an external exposure of the rear-side portion of the display 151 located at the rear side of the mobile terminal 100. When the rear cover 1025 includes a transparent material, the rear-side portion may also be used even in the first state. When an opaque material is used for the rear cover 1025, the rear cover 1025 may cover the sliding frame 103 such that the moving of the sliding frame 103 is not exposed outside. The sliding frame 103 and the second and third areas of the display 151 may move in the first direction and the second direction in a space between the second rear portion 1022 and the rear cover 1025.

FIG. 7 illustrates the driving part 200 of the mobile terminal 100 according to an example embodiment. The mobile terminal 100 of the present disclosure may change a state of the mobile terminal 100 using a method in which a user manually pulls the second frame 102 out of the first frame 101 in the first direction or pushes the second frame 102 into the first frame 101 in the second direction. However, the manual method may cause damage when an excessive force is applied to a main body of the mobile terminal 100. Thus, the mobile terminal 100 may further include the driving part 200 using a motor 201 to stably move the second frame 102 without twisting.

The motor 201 may use the motor 201 that provides a rotating force as illustrated in FIG. 7 and may also use a linear motor that performs a rectilinear motion. To increase the rotating force provided by the motor 201, a diameter of the motor 201 may also be increased. Referring to FIG. 7, two motors 201 may be used to provide a predetermined intensity of driving force or more while preventing an increase in thickness in a restricted space of the mobile terminal 100. The second frame 102 moving too fast may lead to damage or false operation. Thus, a planetary gear may be further provided to reduce the speed of the motor 201 so the motor 201 moves at a stable speed. A planetary gear 202 may serve to amplify or attenuate a number of revolutions of the motor 201 using a plurality of disc gears with different numbers of teeth.

The motor 201 may be fixed to the first frame 101 as shown in (a) of FIG. 7. Also, as shown in (b) of FIG. 7, a position of the motor 201 may be fixed even when the mobile terminal 100 enters the second state in response to the second frame 102 moving in the first direction.

Since the second frame 102 linearly moves in the first direction or the second direction with respect to the first frame 101, a rack and pinion that converts a rotating force of the motor 201 into the linear motion may be used. A pinion gear receiving the rotating force of the motor 201 may be arranged to engage with a rack gear 205 having teeth consecutively arranged in the first direction. The pinion gear may be fixed to the first frame 101 along with the motor 201, and the rack gear 205 may be located at the second frame 102. Conversely, the first frame 101 may also be located at the rack gear 205, and the pinion gear may also be located at the second frame 102 along with the motor 201. Since the pinion gear is caught by the motor 201 so as not to rotate, the second frame 102 may be maintained in the first state and the second state. However, when a large external force is applied, the pinion gear may rotate, which may lead to a displacement of the second frame 102.

Although not shown, a stopper may be further provided to fix a position between the first frame 101 and the rack gear 205 or the second frame 102 so the mobile terminal 100 is fixedly in the first state or the second state. When the motor 201 is driven in response to current being applied, the stopper may be released to allow movement of the second frame 102. When current is not applied so the motor 201 does not rotate, the stopper may be engaged to fix the second frame 102 and a position of the second frame 102.

When the driving part 200 is provided as a pair of driving parts symmetrically disposed in a vertical direction (e.g., the third direction) the driving part 200 may stably move. However, to arrange a battery and the like in consideration of a limited mounting space of the mobile terminal 100, the driving part 200 may be disposed biasedly on one side as shown in (a) of FIG. 7. In some cases, due to such an asymmetric position of the driving part 200, an upper portion and a lower portion of the second frame 102 may move at different speeds so the second frame 102 is twisted. To prevent this, a linear guide 230 may be further provided in the mobile terminal 100.

The linear guides 230 may be provided in both third-direction ends, for example, an upper side and a lower side of the mobile terminal 100 to complement a function of the driving part 200 disposed biasedly on the one side. The linear guide 230 may include a guide rail 231 extended in the first direction and a guide block 232 moving along the guide rail 231. The guide rail 231 may be disposed on the first frame 101 and the guide block 232 may be disposed on the second frame 102, and vice versa. In the present embodiment, the guide rail 231 may be disposed on the second frame 102 to cover upper and lower side surfaces of an extended portion of the second frame 102 in the second state.

The guide block 232 may be coupled to the first frame 101, the guide rail 231 may be coupled to the second frame 102, and then the guide block 232 and the guide rail 231 may be slidably coupled. For the convenience of installation, in a state of the guide block 232 and the guide rail 231 are coupled, the guide block 232 may be fixed to the first frame 101, and then the second frame 102 may be coupled to the guide rail 231.

The guide block 232 may include a guide groove into which the guide rail 231 is inserted. The guide rail 231 may include a rail groove into which a portion of the guide block 232 is inserted. Projections may be formed on a fastening portion of the guide block 232 and the guide rail 231 so the guide rail 231 and the guide block 232 move in the first direction or the second direction without deviating in a thickness direction of the mobile terminal 100. To reduce a friction between the guide block 232 and the guide rail 231, a member formed of a material having a high wear resistance, a low friction resistance, and a self-lubricating property such as polyoxymethylene (POM) or a bearing may be added inside the guide groove.

FIG. 8 illustrates cross-sectional views taken along lines A-A and B-B of FIG. 2. Specifically, (a) of FIG. 8 is a cross-sectional view taken along the line A-A of FIG. 2 and (b) of FIG. 8 is a cross-sectional view taken along the line of FIG. 2. As illustrated in FIG. 2, when the second frame 102 moves in the first direction and enters the second state, the third area 151c located in the rear-side direction may move in the front-side direction. In this case, a structure for supporting the rear side of the third area 151c moved to the front side may be required. The second front portion 1021 located at the front side of the second frame 102 may be located at the rear side of the third area 151c in the second state. However, because the second front portion 1021 may overlap the first front portion 1011 of the first frame 101 in the first state, the first front portion 1011 and the second front portion 1021 may have a level difference therebetween. The level difference between the first front portion 1011 and the second front portion 1021 may create a boundary between the first area 151a and the third area 151c of the flexible display 151. A rolling plate 104 may be used as a support structure for filling a space between the second front portion 1021 and the third area 151c of the flexible display 151.

The rolling plate 104 may be located at the rear side of the flexible display 151 and may have a thickness corresponding to a space between the second front portion 1021 and the flexible display 151 in the second state. As shown in (a) of FIG. 8, in the first state, the rolling plate 104 may be rolled on the roller 210 and located in a direction to the side surface and the rear side of the mobile terminal 100. Also, the flexible display 151 and the rolling plate 104 may be located between the rear cover 1025 covering the rear-side portion of the display 151 and the second rear portion of the second frame 102. As shown in (b) of FIG. 8, when switching to the second state, the rolling plate 104 may move to the front side and thus, located in a front portion of the second frame 102.

The third area 151c in which the rolling plate 104 is located may be a portion in which bending deformation occurs when the first state is changed to the second state. Thus, the rolling plate 104 may be deformed based on the deformation of the third area 151c. Simultaneously, the rolling plate 104 may have a predetermined stiffness such that the flexible display 151 is maintained as being flat when the flexible display 151 is located at the front side or the rear side. As such, the rolling plate 104 may require a structure to be maintained as being flat in the third direction and to be bending-deformable in the first direction.

Figure 9:
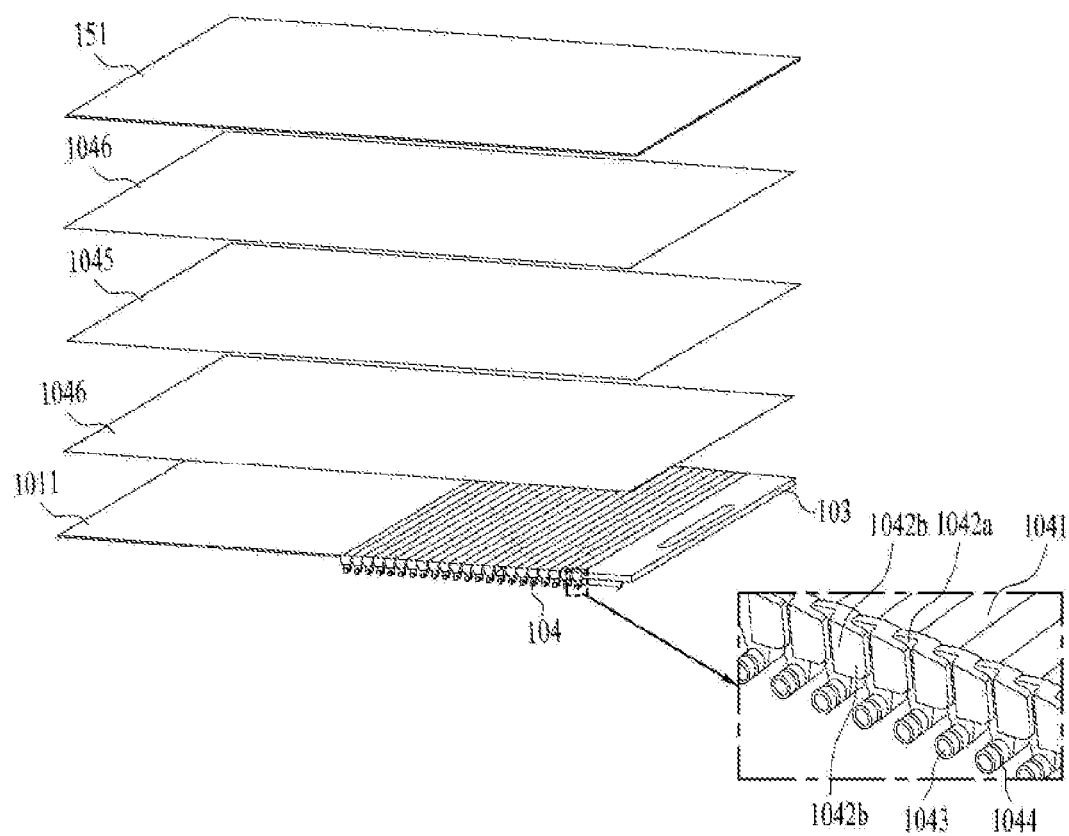
FIG. 9 illustrates a display part and a rolling plate of a mobile terminal according to an example embodiment.

FIG. 9 illustrates the rolling plate 104 and the display 151 of the mobile terminal 100 according to an example embodiment. The rolling plate 104 may include a plurality of support bars 1041 extended in the third direction. The plurality of support bars 1041 may be arranged in parallel in the first direction at preset intervals. Through such arrangement, even when the flexible display 151 is rolled on the roller 210 to be bent, the plurality of support bars 1041 may be prevented from interfering with each other. The support bar 1041 may be implemented as an injection-molded object having a predetermined thickness to achieve the stiffness and may include a metal material such as stainless steel (SUS), for example.

The plurality of support bars 1041 may be directly attached to the rear side of the display 151. In this case, however, it may take a long time and a lot of defects, which may decrease productivity. Also, in a case of directly processing the display 151, the display 151 may be easily damaged. To prevent this, the mobile terminal 100 may further include a rolling sheet 1045 to fix the plurality of support bars 1041. The rolling sheet 1045 may include a metal material, and may use a material having ultra-elasticity to be bending-deformed and maintained as being flat after the bending deformation.

For example, an ultra-elastic metal sheet such as a thin STS sheet having a thickness of 0.05 millimeters (mm) or less may be used. To attach the support bar 1041 to the rolling sheet 1045 and attach the rolling sheet 1045 to the rear side of the display 151, an adhesive tape may be applied to both sides of the rolling sheet 1045.

The rolling sheet 1045 may have a kerf pattern in which a groove extending in the third direction is provided in plural in the first direction. The grooves of the kerf pattern may be formed between the plurality of support bars 1041. Also, desirably, the grooves may be formed in a side on which the support bars 1041 are attached to the rolling sheet 1045. The kerf pattern may be formed in a wedge shape such that a size is large in a surface part of the rolling sheet 1045 and narrowed gradually.

Instead of using the rolling sheet 1045, a material having elasticity such as silicon may be disposed between the support bars 1041 to couple the neighboring support bars 1041 so an angle between the support bars 1041 varies. An elastic connecting part may be bent at a position corresponding to the roller 210 and if located at the front side or the rear side, may stretch so that the support bars 1041 are arranged to form a plane.

The support bars 1041 may form a flat plane corresponding to the rear side of the display 151. Also, as shown in (b) of FIG. 8, the support bars 1041 may form a curved plane with a predetermined curvature. The support bars 1041 of the curved plane may be in close contact with a curved surface of the roller 210 when the rolling plate 104 is rolled on the roller 210.

In some cases, the support bars 1041 may form a plane having one flat surface in contact with the display 151 and the other surface curved with a curvature corresponding to the curvature of the roller 210. In such cases, the support bars 1041 may have maximal thicknesses at a first-directional end and a second-directional end and have a minimum thickness at a center.

The rolling plate 104 may be located at a position corresponding to the third area 151*c*, and rolled and bent over the roller 210 to span the front side and the rear side. The rolling plate 104 may be connected to the first front portion 1011 of the first frame 101 in the front-side direction and connected to the sliding frame 103 in the rear-side direction. In order for the flexible display 151 to form a continuous surface without a level difference, the first front portion 1011 of the first frame 101 located at the rear side of the first area 151*a*, the sliding frame 103 located at the rear side of the second area 151*b*, and the rolling plate 104 located at the rear side of the third area 151*c* may contact the display 151 at the same height. For example, since the sliding frame 103 moves on the rear side of the mobile terminal 100 and moves in the same space as the rolling plate 104, the rolling plate 104 may have a thickness corresponding to that of the sliding frame 103.

Figure 10:
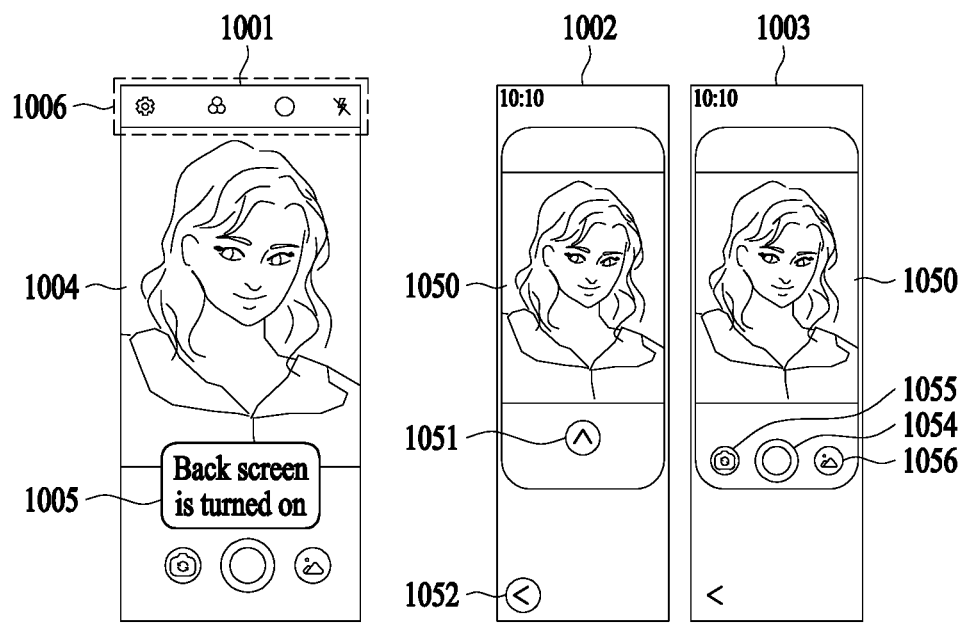
FIGS. 10 and 11 illustrate a mobile terminal according to an example embodiment of the present disclosure.
Figure 11:
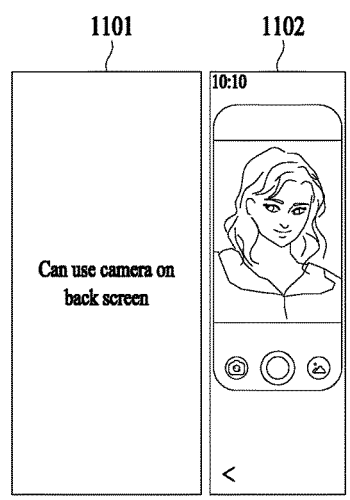

FIGS. 10 and 11 illustrate a mobile terminal according to an example embodiment of the present disclosure. Specifically, FIG. 10 illustrates an example of displaying an image acquired through a camera on a display located at a first side and a second side of the mobile terminal. FIG. 11 illustrates an example of displaying an image acquired through a camera on the display located at the second side of the mobile terminal. In the example embodiment, the displaying of the acquired image may include consecutively displaying images captured by the camera. A user may check a region captured by the camera based on the displayed images and store a specific image or video by applying an input like pushing a capture button, to the terminal.

A display may be located at a first side and a second side of a mobile terminal. The display of at least one of the first side and the second side may display content (e.g., an image). Referring to FIG. 10, for example, a first screen 1001 may be displayed on the display of the first side of the mobile terminal.

When a first input is applied to the mobile terminal or a condition associated to the mobile terminal corresponds to a first condition, the display of the second side of the mobile terminal may display a second screen 1002 or a third screen 1003.

Here, the first side may correspond to a front side of the mobile terminal and the second side may correspond to a rear side of the mobile terminal. In some cases, the first screen 1001 may be displayed in a first area of the first side, and the second screen 1002 or the third screen 1003 may be displayed in a second area of the second side. The first area may include a predetermined area of the first side and the second area may include a predetermined area of the second side.

The first screen 1001 of FIG. 10 may be a screen displayed in response to an execution of an application (e.g., camera application) related to a camera. The first screen 1001 may include an image 1004 acquired through a camera and a control icon 1006 for controlling an application related to the camera. The image 1004 may include an image (or image preview) acquired through the camera in real time but not be limited thereto. In some cases, the image 1004 may include an image acquired through the camera, for example, an image most recently acquired through the camera. Not being limited to the aforementioned example, the control icon 1006 may include various icons and be freely located at various positions on the first screen 1001.

When the display of the second side displays the second screen 1002 or the third screen 1003, notification content 1005 may be displayed on the first screen 1001 to notify that the second screen 1002 or the third screen 1003 is displayed. When the display located at the second side does not display a screen, the notification content 1005 may not be displayed.

The second screen 1002 or the third screen 1003 of FIG. 10 may be a screen displayed on the display of the second side and may include an image 1050 acquired through a camera. The second screen 1002 may be a screen on which a control icon of an application related to the camera briefly appears. The third screen 1003 may be a screen on which a control icon (e.g., a first control icon 1055, a second control icon 1054, and a third control icon 1056) appears in detail.

The image 1050 of the second screen 1002 or the third screen 1003 may correspond to the image 1004 of the first screen 1001. As an example, the image 1050 may be an image in which the image 1004 is reduced in size. As another example, the image 1050 may be an image in which the image 1004 is reduced in size and inverted left and right.

When an input is applied to a first icon 1051 of the second screen 1002, the first control icon 1055, the second control icon 1054, and the third control icon 1056 may appear as shown in the third screen 1003.

The second screen 1002 or the third screen 1003 may include a second icon 1052. When an input is applied to the second icon 1052, provision of the second screen 1002 or the third screen 1003 may terminate.

For example, content representing time information may be displayed on the second screen 1002 or the third screen 1003 but not limited thereto. In some cases, time information may be omitted.

The camera for acquiring the images 1004 and 1050 may be located on the second side of the mobile terminal. An object included in the images 1004 and 1050 may be positioned in a direction of the second side. When the image 1050 is displayed on the second side in addition to the first side, information on an image 1004 and the image 1050 may be provided to both the user who faces the first side and controls the mobile terminal and an object of the images 1004 and 1050, so that the user uses the camera with increased convenience.

Referring to FIG. 11, a first screen 1101 with limited functions is displayed on a first side and a second screen 1102 including an image acquired through a camera is displayed on a second side.

Specifically, the first screen 1101 may include a screen on which at least a portion of functions of the first screen 1001 of FIG. 10 are restricted. As an example, the first screen 1101 may include a screen on which an input to a control icon of an application related to a camera is restricted. As another example, the first screen 1101 may include a screen provided based on deactivation of touch input sensing. In this case, for example, the first screen 1101 including a text "can use camera on back screen" may be displayed.

The second screen 1102 may correspond to the third screen 1003 of FIG. 10 but is not limited thereto. Depending on an example, the second screen 1102 may correspond to the second screen 1002 of FIG. 10.

A case in which the first screen 1101 is displayed on the display of the first side and the second screen 1102 is displayed on the display of the second side may include a situation in which a user turns the mobile terminal and takes a selfie with a camera disposed on the rear side. In this case, an input to the first side may be restricted and an input to the second side may be sensed. Through this, an unintended input applied to the first side due to a gripping motion of the mobile terminal may be prevented, so that a false operation of the mobile terminal is prevented. For example, the camera on the second side may be capable of high-performance shooting compared to the camera on the first side. As such, it is possible to capture images in various ways by providing a user interface (UI) for taking a selfie through the second side.

Figure 12:
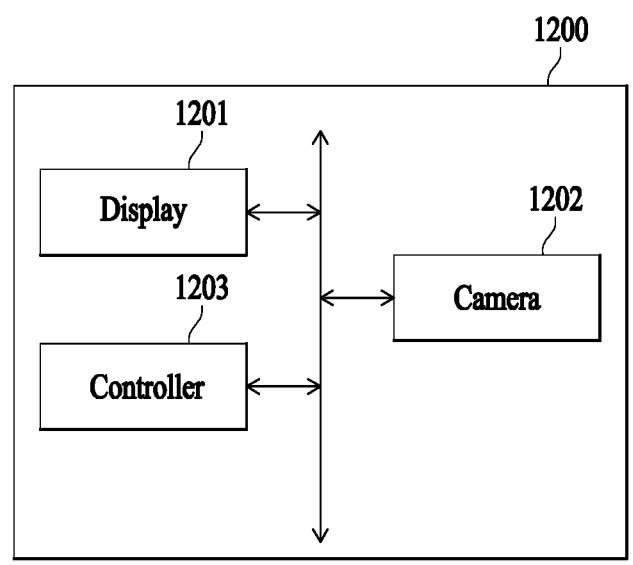
FIG. 12 is a functional block diagram illustrating a mobile terminal according to an example embodiment of the present disclosure.

FIG. 12 is a functional block diagram illustrating a mobile terminal according to an example embodiment of the present disclosure. As described below, an element of a mobile terminal 1200 may be a unit that processes at least one function or operation and may be implemented through hardware, software, or a combination of hardware and software.

Referring to FIG. 12, the mobile terminal 1200 may include a display 1201, a camera 1202, and a controller 1203.

The display 1201 may be provided such that a size by which the display 1201 is exposed at a first side (e.g., a front side of the mobile terminal 1200) of the mobile terminal 1200 is changeable. The size of the display 1201 exposed at the first side may be changed based on a control of the controller 1203 as described below.

In the example embodiment, a portion of the display 1201 may be located at the first side of the mobile terminal 1200, and another portion may be located at a second side of the mobile terminal 1200. For example, a first area of the display 1201 may be located on the first side of the mobile terminal 1200, and a second area of the display 1201 may be located on the second side facing the first side. Here, the first side may include the front side of the mobile terminal 1200, and the second side may include a rear side of the mobile terminal 1200 facing the first side.

A portion of the display 1201 may be located at the first side. Also, another portion of the display 1201 may be rolled at one side of the mobile terminal 1200 to be located on the second side of the mobile terminal 1200. Specifically, the display 1201 may be bent at one end contacting the first side, at least a portion of the display 1201 may be located at the first side, and at least another portion of the display 1201 may be located at the second side contacting the one end. Since the related description has been made above, repeated description is omitted. However, embodiments are not limited thereto. In some cases, the display 1201 may be located at each of the first side and the second side facing the first side.

The display 1201 may display a variety of information associated with an operation of the mobile terminal 1200. For example, the display 1201 may display content related to an application (e.g., camera application) provided in response to an execution of the application or content indicating the application.

The camera 1202 may be disposed on the second side (e.g., the rear side of the mobile terminal 1200). The camera 1202 may be spaced apart from the display 1201 of the second side. In some cases, an area including the camera 1202 may be separated from an area including the display 1201. In such cases, a distance between the area of the display 1201 and the area of the camera 1202 may be changed on the second side in response to a change in size of the display 1201 exposed at the first side. For example, when the size of the display 1201 exposed at the first side increases, a size of the display 1201 exposed at the second side may be reduced. In this example, the camera 1202 and the display 1201 on the second side may be spaced apart from each other, so that a distance between the camera 1202 and the display 1201 on the second side increases.

The area including the camera 1202 and the area including the display 1201 may be connected by a hinge. The camera 1202 and the display 1201 located together on the second side may be positioned on different sides into which the second side is separated in half by moving the hinge. For example, the area including the camera 1202 and the area including the display 1201 may be changed to have a predetermined angle based on the hinge, so that the display 1201 is located at the second side and the camera 1202 is located on a third side.

The camera 1202 may include a plurality of cameras. For example, the camera 1202 may include a plurality of cameras having different lenses.

The camera 1202 may generate an image by acquiring information on an object or space positioned in a direction facing a lens of the camera 1202 based on the control of the controller 1203 as described below. For example, when a person stands with facing the lens of the camera 1202, an image generated by the camera 1202 may include a person image. Since technology relating to the camera 1202 is easy for those skilled in the art, a detailed description will be omitted.

Although not shown, the mobile terminal 1200 may include at least one sensor. The at least one sensor may include, for example, a pose sensor that senses a pose of the mobile terminal 1200. The pose sensor may include a sensor for sensing a pose of the mobile terminal 1200 based on sensing of an angle or direction such as a gyro sensor, but not be limited thereto. The pose sensor may also include a variety of sensors within a range easy for those skilled in the art.

The controller 1203 may control the mobile terminal 1200 or components of the mobile terminal 1200. For example, the controller 1203 may execute a command or application program stored in a memory to control an operation of the display 1201 or the camera 1202.

The controller 1203 may acquire an image using the camera 1202. For example, the controller 1203 may acquire an image by driving the camera 1202 based on an execution of a camera-related application.

The controller 1203 may display the image acquired through the camera 1202 on the display 1201. Specifically, the controller 1203 may display the image acquired through the camera 1202 in at least one of the first area of the first side and the second area of the second side of the display 1201.

The controller 1203 may verify whether information sensed by at least one sensor (e.g., pose sensor) corresponds to a first condition or a second condition. In one example, the first condition may include a case in which a pose of the mobile terminal 1200 corresponds to a first pose. The second condition may include a case in which a pose of the mobile terminal 1200 corresponds to a second pose. Here, the first pose may be a pose at which a user views the first side (e.g., the front side) of the mobile terminal 1200, and may include a pose corresponding to a case in which information sensed by a sensor is first information. The second pose may be a pose at which a user views the second side (e.g., the rear side) of the mobile terminal 1200, and may include a pose corresponding to a case in which information sensed by a sensor is second information. The first information and the second information may be, for example, information having a difference of 180 degrees)(° based on a longitudinal axis of the mobile terminal 1200, but not be limited thereto.

In another example, the first condition may include a case in which a change amount of information sensed by a sensor is within a predetermined range. The second condition may include a case in which a change amount of information sensed by a sensor exceeds the predetermined range. For example, the first condition may include a case in which a change in angle of the mobile terminal 1200 verified based on information sensed by a sensor is within a range between −90° and +90°, and the second condition may include a case in which a change in angle exceeds the range between −90° and +90°

When sensed information corresponds to the first condition, the controller 1203 may display the image acquired through the camera 1202 in the first area and the second area. For example, the controller 1203 may display the image acquired through the camera 1202 in the first area in response to an execution of an application related to the camera 1202. In this example, the controller 1203 may display, in the second area, the image displayed in the first area in response to the first condition being satisfied. The image displayed in the second area may correspond to at least a portion of the image displayed in the first area and be different in size, but not be limited thereto.

In the first area, at least one of an acquired image and a control icon for controlling an application related to the camera 1202 may be further displayed. As the control icon, for example, at least one of a shooting icon (or shooting button) for storing an image, a zooming icon for controlling a zoom-function of the camera 1202, an album icon for accessing an acquired image, a correcting icon for color correction of the camera 1202, a timer icon for timer setting of image capturing, and a flash icon for flash setting may be displayed.

In the second area, an image acquired through the camera 1202 may be displayed. In some cases, an image acquired through the camera 1202 and a minimum number of control icons, for example, a shooting icon may be displayed in the second area. However, embodiments are not limited thereto. As described with reference to FIG. 10, a hidden icon appearing based on an input (e.g., the first icon 1051 of FIG. 10) may be displayed in the second area.

When sensed information corresponds to the second condition, the controller 1203 may display an image acquired through the camera 1202 in the second area. In one example, the controller 1203 may display an image acquired through the camera 1202 in the first area in response to an execution of an application related to the camera 1202. In this example, the controller 1203 may suspend displaying of the image in the first area and display the image in the second area in response to the second condition being satisfied.

In another example, in response to the second condition being satisfied, the controller 1203 may at least temporarily suspend image displaying in the first area and display an image acquired through the camera 1202 in the second area. In some cases, the controller 1203 may display predetermined content in the first area. The content displayed in the first area may include, for example, a text indicating that an image is provided in the second area but not be limited thereto.

In another example, in response to the second condition being satisfied, the controller 1203 may restrict at least a portion of functions provided in the first area and display an image acquired through the camera 1202 in the second area. In this example, provision of some functions of an application related to the camera 1202 through the first area may be restricted. In some cases, the controller 1203 may display the predetermined content in the first area.

In another example, in response to the second condition being satisfied, the controller 1203 may deactivate touch input sensing for at least a portion of the first area. The controller 1203 may display an image acquired through the camera 1202 in the second area in addition to the deactivating of the touch input sensing. In this example, an input to an application related to the camera 1202 through the first area may be restricted. In some cases, the controller 1203 may display the predetermined content in the first area.

When a pose of the mobile terminal 1200 sensed by a pose sensor corresponds to a predetermined pose, the controller 1203 may display an image acquired through the camera 1202 in the second area. When an angle between a horizontal plane and a plane corresponding to the second area is less than or equal to a specific angle, the controller 1203 may display the image acquired through the camera 1202 in the second area. The angle between the horizontal plane and the plane corresponding to the second area may be acquired based on the pose sensor.

In response to the execution of the application related to the camera 1202, the controller 1203 may display a first icon and a second icon in the first area. The controller 1203 may display an image in the first area and the second area in response to a touch input to the first icon and display an image acquired through the camera in the second area in response to a touch input to the second icon. When the image is displayed in response to the touch input to the second icon, the displaying of the image in the first area may be omitted. A related example will be described with reference to FIG. 16.

The controller 1203 may display an image acquired through the camera 1202 in the first area and the second area in response to a touch input corresponding to the first area and may display the image acquired through the camera in the second area in response to the touch input corresponding to the second area. A touch input corresponding to the first area or the second area may include, for example, at least one of a swipe input and a knock-on input. Here, at least one of the touch input corresponding to the first area and the touch input corresponding to the second area may be received in a state in which at least a portion of functions of the application related to the camera 1202 are suspended. A related example will be described with reference to FIG. 17.

The controller 1203 may display an image acquired through the camera 1202 in the first area and the second area in response to the first input to a predetermined physical key and display the image acquired through the camera in the second area in response to the second input to the predetermined physical key. The predetermined physical key may include, for example, a power button or a volume button, the first input may include a single click, and the second input may include a double click. However, embodiments are not limited thereto.

In response to the image being displayed in the second area, the controller 1203 may suspend (or at least temporarily stop) displaying the image in the first area. In some cases, in response to the image being displayed in the second area, the controller 1203 may restrict at least a portion of functions of an application related to the camera 1202 in association with the first area or restrict touch input sensing for at least a portion of the first area.

When an image acquired through the camera 1202 includes a person image, the controller 1203 may display the image in the first area and the second area. For example, the controller 1203 may verify whether a region representing a person is present in the image acquired through the camera 1202. When it is verified that the region representing the person is present, the controller 1203 may determine that a person image is included. In response to the person image being included in the image, the controller 1203 may display the image in the first area and the second area.

When the image acquired through the camera 1202 includes a person image and a proportion of an area occupied by the person in the image is greater than or equal to a predetermined proportion (e.g., 50%), the controller 1203 may display the image in the first area and the second area. Specifically, the controller 1203 may calculate a proportion of an area occupied by a person in an image based on an image analysis. When the calculated proportion is greater than or equal to a predetermined proportion, the controller 1203 may display the image in the first area and the second area. Here, various image analysis methods that are easy for those skilled in the art may be used for the image analysis.

When an image acquired through the camera 1202 is displayed in the first area, the controller 1203 may restrict (or deactivate) touch input sensing for the second side (e.g., at least a portion of the second area). As an example, when an image is displayed in the first area, the controller 1203 may restrict touch input sensing for the entire second area.

As another example, in response to an image being displayed in the first area, the controller 1203 may sense a touch input applied to the second area. When the touch input applied to the second area is sensed, the controller 1203 may identify a position at which the touch input is sensed and deactivate touch input sensing for an area corresponding to the identified position. The area corresponding to the identified position may be determined in advance but not be limited thereto. The area corresponding to the identified position may include, for example, an area within a radius of a specific distance (e.g., 1 cm) from the identified position.

In some cases, the controller 1203 may activate touch input sensing for a portion corresponding to a portion in which a control icon is displayed in the second area. Specifically, when touch input sensing for at least a portion of the second area is restricted, the controller 1203 may identify a portion corresponding to the control icon in the restricted portion. The controller 1203 may activate the touch input sensing for the portion corresponding to the control icon.

The controller 1203 may identify a touch input sensed in the second area and determine a position of an image displayed in the second area based on a position of the touch input. For example, the controller 1203 may display an image at a position distinguished from the position of the touch input sensed in the second area. In this example, when the touch input is applied to a lower portion of the second area, the image may be displayed in an upper portion of the second area. Also, when the touch input is applied to the upper portion of the second area, the image may be displayed in the lower portion of the second area. A related example will be described with reference to FIG. 20.

In response to the image being displayed in the second area, the controller 1203 may further display predetermined content in the first area. The predetermined content may include, for example, a text "back screen is turned on." In some cases, when an image is displayed in the second area and image display in the first area is suspended, the controller 1203 may further display the predetermined content in the second area. The content displayed in the second area may include a text "front screen is locked." A related example will be described with reference to FIG. 15.

Figure 13:
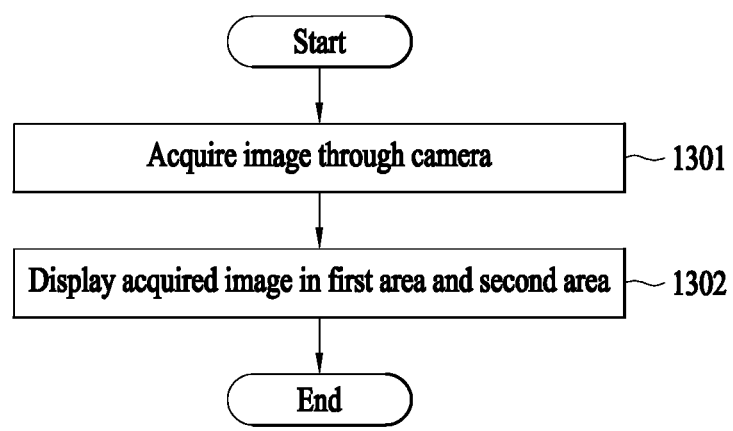
FIG. 13 is a flowchart illustrating a method of controlling a mobile terminal according to an example embodiment of the present disclosure.

FIG. 13 is a flowchart illustrating a method of controlling a mobile terminal according to an example embodiment of the present disclosure. Operations illustrated in FIG. 13 may be performed in different orders or irrespective of an order depending on cases. Hereinafter, redundant description which has been made above will be omitted.

Referring to FIG. 13, in operation 1301, a mobile terminal may acquire an image through a camera. Specifically, the mobile terminal may drive the camera based on an execution of an application related to the camera and acquire an image through the camera. The image acquired through the camera may be an image of an area located to face a lens of the camera. When a person is included in the area, the image may include a person image.

At least a portion of a display of the mobile terminal may be located at a first side (e.g., a front side) of the mobile terminal and another portion may be located at a second side (e.g., a rear side) of the mobile terminal. In some cases, the display may be implemented as a flexible display that is rolled at a side surface of the mobile terminal to be located at the first side and the second side.

In operation 1302, the mobile terminal may display the acquired image in a first area and a second area. The first area may correspond to one area of the display located at the first side. The second area may correspond to one area of the display located at the second side. For example, the first area may be larger than the second area. In this example, the image may be provided in a size appropriate for each area.

In the first area, a control icon of the application related to the camera may be displayed. In the second area, a portion of the control icon displayed in the first area may be displayed and, in some cases, the control icon may not be displayed.

The image displayed in the first area and the second area may be an image acquired through the camera in real time. In this case, in response to an input being applied to an icon for capturing among control icons, an image corresponding to the input may be stored in the mobile terminal as a picture.

Figure 14:
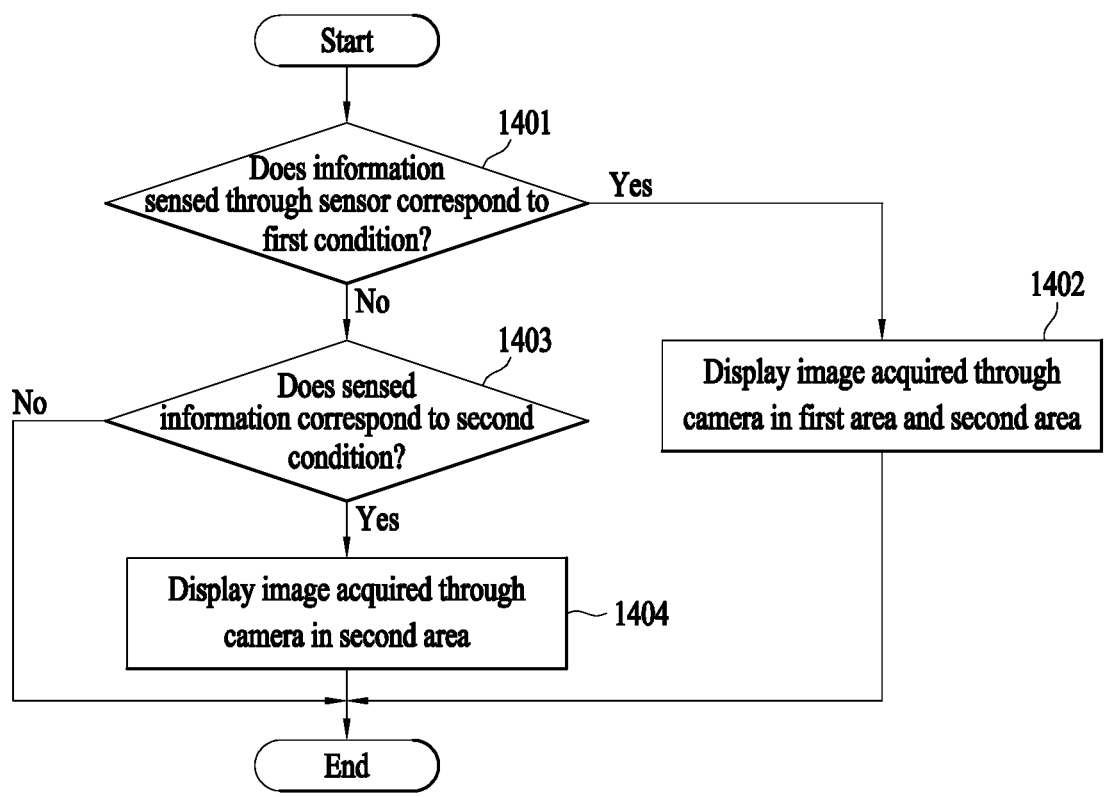
FIG. 14 is a flowchart illustrating one operation of a method of controlling a mobile terminal in detail according to an example embodiment of the present disclosure.

FIG. 14 illustrates one operation of a method of controlling a mobile terminal in detail according to an example embodiment of the present disclosure. FIG. 14 illustrates operation 1301 of FIG. 13 in detail.

Referring to FIG. 14, in operation 1401, the mobile terminal may verify whether information sensed through a sensor corresponds to a first condition. Here, the sensor may include at least one sensor included in the mobile terminal. The sensor may include, for example, a pose sensor. A variety of known sensors may be used as the pose sensor, which is easy for those skilled in the art, and thus, a detailed description will be omitted. The information sensed through the sensor may include, for example, a sensor sensed value. The sensor sensed value may be represented by a number, but is not limited thereto.

When the information sensed through the sensor corresponds to the first condition, the mobile terminal may display the image acquired through the camera in the first area and the second area in operation 1402. For example, when the information sensed through the sensor corresponds to predetermined information, the mobile terminal may display the image acquired through the camera in the first area and the second area. The predetermined information may include, for example, information indicating that a specific input is applied or information indicating that a pose of the mobile terminal corresponds to a predetermined pose, but is not limited thereto.

When the first input is applied, the mobile terminal may display the image acquired through the camera in the first area and the second area. The first input may include, for example, an input applied to a first position (e.g., at least a portion of the first area) of the mobile terminal, an input of a specific type (e.g., a swipe input and a knock-on input), or an input in a specific form (e.g., a double-tap input, a long-press input, an input of moving in a predetermined direction).

When a person image is included in the image acquired through the camera, or when a proportion of the person image to the image is greater than or equal to a predetermined value, the mobile terminal may display the image acquired through the camera in the first area and the second area.

When the image is displayed in the first area and the second area, the mobile terminal may restrict an input (e.g., a touch input) applied to at least a portion of the second area. For example, the mobile terminal may identify a position at which a touch input is sensed in the second area and restrict an input to an area corresponding to the identified position. In some cases, a control icon may be displayed in the area to which the input is restricted. In such cases, an input to a portion corresponding to the control icon may be allowed.

When the image is displayed in the first area and the second area, a user of the mobile terminal and a model corresponding to a target for shooting may confirm the image. In this case, the model may actively use the camera, for example, change a pose while viewing the image. Also, the user of the mobile terminal may smoothly perform communication about an appearance represented in the image. As such, a usability of the camera may be increased.

When the information sensed through the sensor does not correspond to the first condition, the mobile terminal may verify whether the sensed information corresponds to the second condition in operation 1403. The second condition may be a condition differing from the aforementioned first condition. As an example, the second condition may include, for example, a case in which information sensed through the sensor does not correspond to predetermined information. As another example, the second condition may include a case in which the mobile terminal is at a pose turned 180° or a case in which an angle between a horizontal plane and a plane corresponding to the second area is less than or equal to a predetermined angle.

When the information sensed through the sensor corresponds to the second condition, the mobile terminal may display the image acquired through the camera in the second area in operation 1404. In this case, the displaying of the image in the first area may be omitted (or temporarily suspended). Also, input sensing (e.g., touch input sensing) for at least a portion of the first area may be restricted.

A case in which the second condition is satisfied may be a case in which the user of the mobile terminal is to take a selfie using a camera mounted on the second side. In this case, as described above, the input sensing or the image display in the first area may be restricted while an image is displayed in the second area. Through this, the touch input sensing may be actively changed in response to a change of a gripping method of the mobile terminal so an unintended touch input is prevented, which may prevent a false operation.

Figure 15:
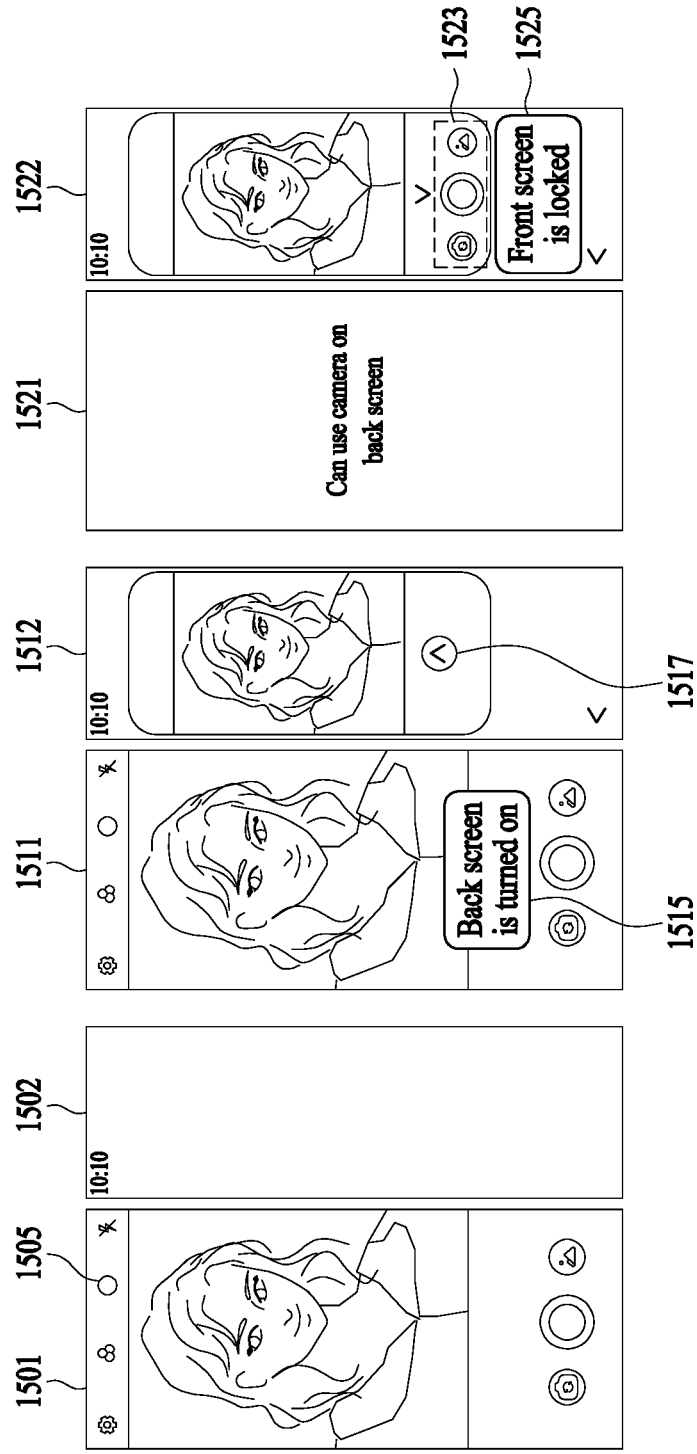
FIG. 15 illustrates an example of a screen displayed on a mobile terminal according to an example embodiment of the present disclosure.

FIG. 15 illustrates an example of a screen displayed on a mobile terminal according to an example embodiment of the present disclosure.

Referring to FIG. 15, when an application related to a camera (hereinafter, referred to as "camera app") is executed, a first screen 1501 may be displayed in a first area of a first side of a mobile terminal and a second screen 1502 may be displayed in a second area of a second side. The first screen 1501 may include an image acquired through a camera and various control icons of the camera app. The second screen 1502 may be a locked screen in which displaying of contents associated with the camera app is omitted. As illustrated, time information (e.g., 10:10) may be displayed. However, the present example is not to be taken as being limited thereto. In the following embodiments, a description will be made based on a pair of screens on the first side and the second side.

The first screen 1501 may include a first icon 1505 for displaying the image acquired through the camera in the second area. In response to an input to the first icon 1505, a third screen 1511 may be displayed in the first area and a fourth screen 1512 may be displayed in the second area.

In some cases, when the information sensed through the sensor corresponds to the first condition, the third screen 1511 may be displayed in the first area and the fourth screen 1512 may be displayed in the second area. As an example, the first condition may include a case in which a presence of an object facing the second side is sensed. As another example, the first condition may include a case in which a touch input to the first icon 1505 is sensed in the mobile terminal. The first condition is not limited to the aforementioned example and may include a variety of conditions determined in advance.

The third screen 1511 may be a screen including first content 1515 in addition to the first screen 1501. The first content 1515 may be content indicating that the fourth screen 1512 is displayed in the second area and include a text "back screen is turned on" as illustrated. In this case, a user viewing the first side (e.g., the front side) may easily grasp a situation of the back screen.

The fourth screen 1512 may include a second icon 1517 for providing a control icon and the image acquired through the camera. Here, the control icon may be displayed in response to an input to the second icon 1517.

When an input is applied to the second icon 1517 of the fourth screen 1512, a control icon 1525 may be displayed or provided. In this example, the control icon 1525 provided in response to the input to the second icon 1517 may be a portion of the control icon provided through the first screen 1501.

When the information sensed through the sensor corresponds to the second condition, a fifth screen 1521 may be displayed in the first area and a sixth screen 1522 may be displayed in the second area. As an example, the second condition may include a case in which a pose of the mobile terminal corresponds to a predetermined pose. As another example, the second condition may include a case in which a specific touch input (e.g., a swipe input in the first direction) is sensed in the mobile terminal. The second condition is not limited to the aforementioned example and may include a variety of conditions differing from the first condition.

The fifth screen 1521 may be a screen with providing at least some restricted functions of the camera app. For example, the fifth screen 1521 may be a screen in a state in which touch input sensing for the camera app through the fifth screen 1521 is restricted. In this example, as illustrated, the displaying of the control icon or the image acquired through the camera may be omitted (or suspended) and specific content may be displayed. The specific content may include a text "can use camera on back screen" as illustrated, but is not limited thereto.

The sixth screen 1522 may include the control icon 1523 and the image acquired through the camera. For example, the sixth screen 1522 may further include specific content as illustrated. The specific content may include, for example, a text "front screen is locked" but is not limited thereto.

Figure 16:
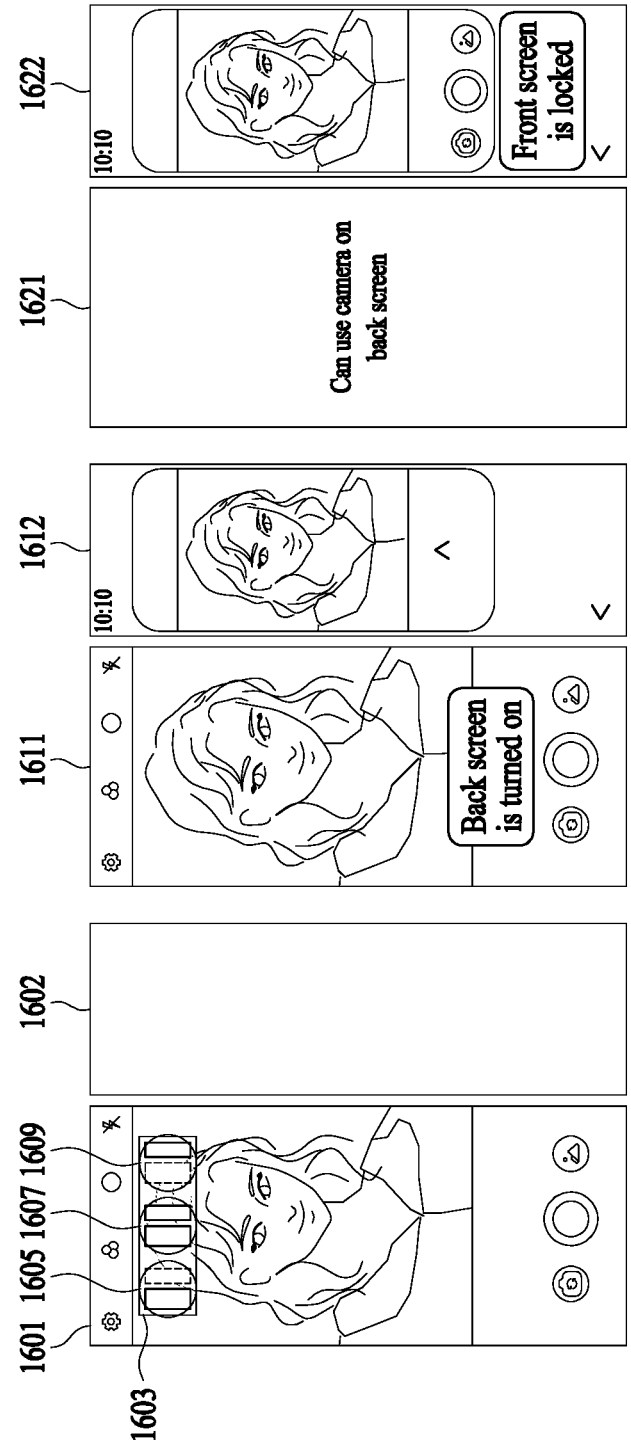
FIG. 16 illustrates another example of a screen displayed on a mobile terminal according to an example embodiment of the present disclosure.

FIG. 16 illustrates another example of a screen displayed on mobile terminal according to an example embodiment of the present disclosure. Specifically, FIG. 16 illustrates a case in which an image acquired through a camera is displayed in a first area and a second area based on a user input, or an image acquired through a camera is displayed in the second area.

Referring to FIG. 16, in response to a camera app being executed, a first screen 1601 may be displayed in a first area on a first side (e.g., a front side) of a mobile terminal and a second screen 1602 may be displayed in a second area on a second side (e.g., a rear side) of the mobile terminal.

The first screen 1601 may include a control icon for controlling settings of a camera or an operation of the camera and icons (e.g., a first icon 1605, a second icon 1607, and a third icon 1609) for controlling a screen display of the mobile terminal. In the second screen 1602, provision of contents associated with the camera app may be omitted. Depending on a case, the second screen 1602 may be, for example, a screen corresponding to a locked state and an inactivated state.

The icons for controlling the screen display may be displayed in a specific area 1603. The icons for controlling the screen display may be displayed on the first screen 1601 in response to a specific input being applied. Among the icons for controlling the screen display, the first icon 1605 may include an icon that instructs a screen to be displayed in the first area and the screen display to be omitted in the second area. The second icon 1607 may include an icon that instructs a screen to be displayed in each of the first area and the second area. The third icon 1609 may include an icon that instructs the screen display to be omitted in the first area and a screen to be displayed in the second area.

When an input is applied to the first icon 1605, the first screen 1601 and the second screen 1602 may be displayed on the mobile terminal. Specifically, when an input is applied to the first icon 1605, the first screen 1601 may be displayed in the first area of the mobile terminal and the second screen 1602 may be displayed in the second area.

When an input is applied to the second icon 1607, a third screen 1611 and a fourth screen 1612 may be displayed on the mobile terminal. Specifically, when an input is applied to the second icon 1607, the third screen 1611 may be displayed in the first area of the mobile terminal and the fourth screen 1612 may be displayed in the second area. Since the third screen 1611 may correspond to the third screen 1511 of FIG. 15 and the fourth screen 1612 may correspond to the fourth screen 1512 of FIG. 15, a detailed description will be omitted.

When an input is applied to the third icon 1609, a fifth screen 1621 and a sixth screen 1622 may be displayed on the mobile terminal. Specifically, when an input is applied to the third icon 1609, the fifth screen 1621 may be displayed in the first area of the mobile terminal and the sixth screen 1622 may be displayed in the second area. Since the fifth screen 1621 may correspond to the fifth screen 1521 of FIG. 15 and the sixth screen 1622 may correspond to the sixth screen 1522 of FIG. 15, a detailed description will be omitted.

Figure 17:
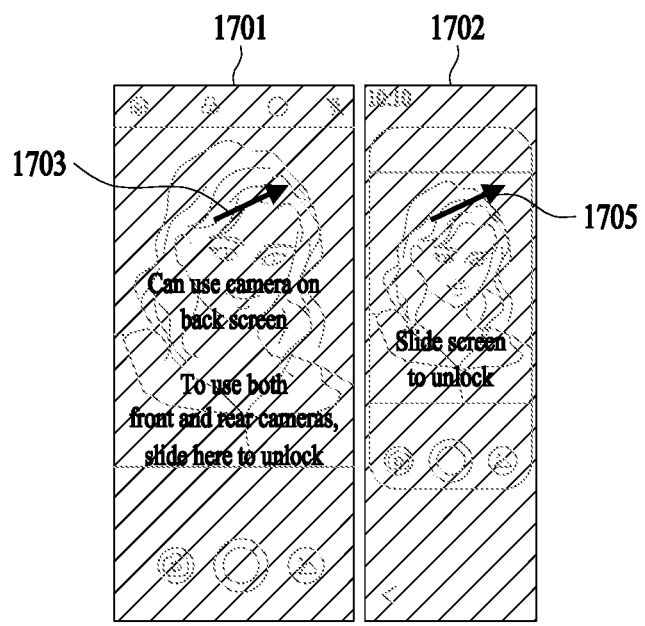
FIG. 17 illustrates another example of a screen displayed on a mobile terminal according to an example embodiment of the present disclosure.

FIG. 17 illustrates another example of a screen displayed on a mobile terminal according to an example embodiment of the present disclosure. Specifically, FIG. 17 illustrates a case in which displaying of an image acquired through a camera is controlled based on an input applied to the mobile terminal.

Referring to FIG. 17, a first screen 1701 may be displayed in a first area on a first side of the mobile terminal and a second screen 1702 may be displayed in a second area on a second side of the mobile terminal. The first screen 1701 and the second screen 1702 may be displayed in response to a camera app being executed or when a specific input is applied. However, embodiments are not limited thereto and the first screen 1701 and the second screen 1702 may be displayed when a predetermined condition is satisfied.

The first screen 1701 and the second screen 1702 may be a screen with providing some restricted functions of the mobile terminal. For example, the first screen 1701 and the second screen 1702 may be screens displayed in a state in which a function of the camera app is restricted. In this example, acquiring of an image through a camera or controlling of the camera may be suspended.

The first screen 1701 may be an overlapping screen appearing on the first screen 1501 of FIG. 15 at a first transparency. The second screen 1702 may be an overlapping screen appearing on the second screen 1502, the fourth screen 1512, or the sixth screen 1522 of FIG. 15 at the first transparency. The first transparency may correspond to a predetermined value.

The restricted function may be activated when a specific input is applied in a state in which the first screen 1701 and the second screen 1702 are displayed. The specific input may include, for example, a first input 1703 or a second input 1705. The first input 1703 may be an input applied to at least a portion of the first area. The second input 1705 may be an input applied to at least a portion of the second area. As an example, the first input 1703 may be a swipe input to the first area and the second input 1705 may be a swipe input to the second area. As another example, the first input 1703 may be a swipe input applied to the first area in a first direction and the second input 1705 may be a swipe input applied to the second area in the first direction. As another example, the first input 1703 may be a swipe input applied to the first area in the first direction and the second input 1705 may be a swipe input applied to the second area in a second direction. Types of the first input 1703 and the second input 1705 are not limited to the aforementioned examples and thus, may be implemented in various forms.

The first screen 1701 and the second screen 1702 may each provide content indicating that at least a portion of functions are restricted. For example, as illustrated, a text "to use both front and rear cameras, slide here to unlock" may be displayed on the first screen 1701. Also, a text "slide screen to unlock" may be displayed on the second screen 1702. However, embodiments are not limited thereto and, on the first screen 1701 or the second screen 1702, additional content (e.g., content indicating "can use camera on back screen") may be further displayed or some contents may be omitted.

Figure 18:
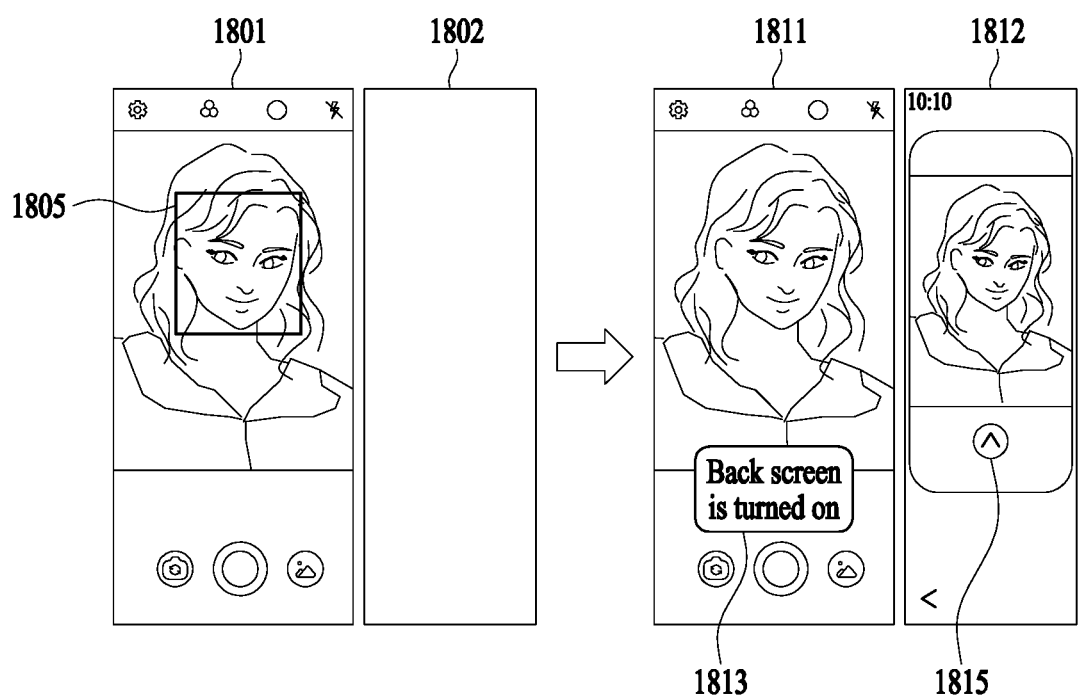
FIGS. 18 and 19 illustrate a method of controlling a mobile terminal based on an image acquired by the mobile terminal according to an example embodiment of the present disclosure.
Figure 19:
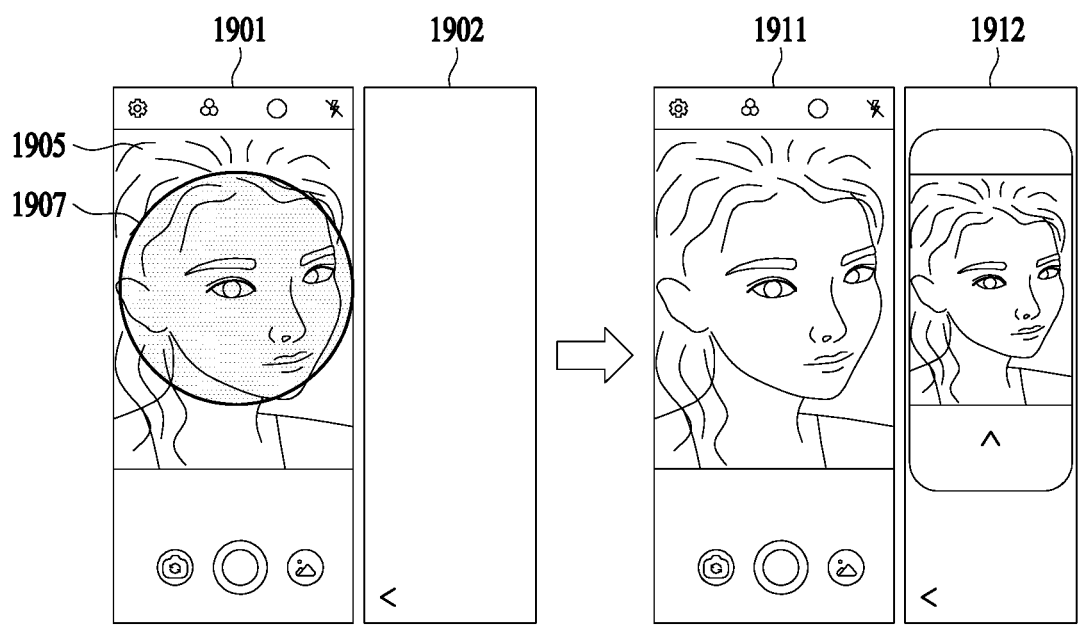

FIGS. 18 and 19 illustrate a method of controlling a mobile terminal based on an image acquired by the mobile terminal according to an example embodiment of the present disclosure. Specifically, FIG. 18 illustrates a method of displaying an image based on whether a person image is included and FIG. 19 illustrates a method of displaying an image based on a proportion occupied by a person in a person image.

Referring to FIG. 18, a mobile terminal may acquire an image through a camera and display the acquired image through a first screen 1801 in a first area of a first side of the mobile terminal. Based on the displaying on the first screen 1801, the mobile terminal may display a second screen 1802 in a second area on a second side of the mobile terminal. The first screen 1801 may correspond to the first screen 1501 of FIG. 15 and the second screen 1802 may correspond to the second screen 1502 of FIG. 15.

Meanwhile, the image acquired through the camera may be information on a space facing the camera. When a person is present in the space, the image acquired through the camera may include a person image 1805 as illustrated.

The mobile terminal may verify whether the person image 1805 is included in the image acquired through the camera. For example, the mobile terminal may verify whether a feature point corresponding to the person image 1805 is included in an acquired image and verify whether the person image 1805 is included in the acquired image based on a verification result.

When the person image 1805 is included in the image acquired through the camera, the mobile terminal may display the image in the second area. Specifically, when the person image 1805 is included in the image, the mobile terminal may display a third screen 1811 in the first area and display a fourth screen 1812 in the second area. The third screen 1811 may be a screen on which specific content 1813 is further displayed in addition to the first screen 1801. The fourth screen 1812 may be a screen that shows the image acquired through the camera and an icon 1815 for providing at least a portion of control icons in response to an input. The icon 1815 may correspond to the second icon 1517 of FIG. 15. In some cases, the icon 1815 may be replaced with a portion (e.g., a shooting icon) of a control icon.

Referring to FIG. 19, the mobile terminal may display a first screen 1901 in the first area and display a second screen 1902 in the second area. The first screen 1901 may include an image 1905 acquired through the camera. The second screen 1902 may include a locked screen or an inactivated screen.

The mobile terminal may identify a proportion of an area occupied by a person (or person image) 1907 in the image 1905 acquired through the camera. When the proportion of the area occupied by the person 1907 in the image 1905 is greater than or equal to a predetermined proportion, the mobile terminal may display a third screen 1911 in the first area and display a fourth screen 1912 in the second area.

Here, the third screen 1911 may correspond to the first screen 1901.

However, embodiments are not limited thereto and additional content, for example, a text "back screen is turned on" may be further displayed on the third screen. The fourth screen 1912 may include a screen in which the image acquired through the camera is displayed. For example, the fourth screen 1912 may correspond to the fourth screen 1812 of FIG. 18.

Figure 20:
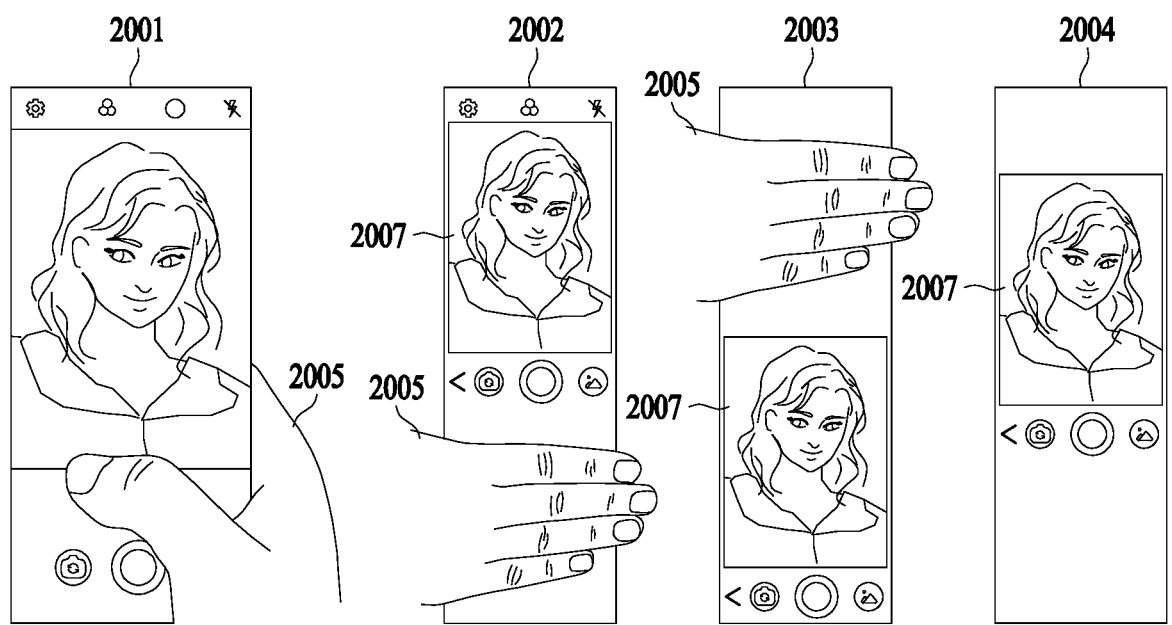
FIG. 20 illustrates a method of controlling a mobile terminal based on an input applied to the mobile terminal according to an example embodiment of the present disclosure.

FIG. 20 illustrates a method of controlling a mobile terminal based on an input applied to the mobile terminal according to an example embodiment of the present disclosure.

Referring to FIG. 20, a first screen 2001 including an image acquired through a camera and a control icon of a camera app may be displayed on a first side (e.g., a front side) of a mobile terminal in response to the camera app being executed. As illustrated, a user may use the mobile terminal by gripping the mobile terminal with a hand 2005. In this case, a touch input may be applied by the user to the first side (e.g., the front side) and a second side (e.g., a rear side) of the mobile terminal. As an example, when the user is gripping a lower portion of the mobile terminal with the hand 2005, touch inputs may be applied to lower portions of the first side and the second side of the mobile terminal. As another example, when the user is gripping an upper portion of the mobile terminal with the hand 2005, touch inputs may be applied to upper portions of the first side and the second side of the mobile terminal.

The mobile terminal may identify a position of a touch input applied to the second side. Specifically, the mobile terminal may identify a position of a touch input applied to the second side (or a second area) in response to the first screen 2001 being displayed. In this case, the mobile terminal may display an image 2007 in a position differing from the position identified based on the displaying of the image 2007 in the second area. For example, when a position of the touch input corresponds to the lower portion of the second side, the mobile terminal may display the image 2007 in the upper portion as shown in a second screen 2002. When a position of the touch input corresponds to the upper portion of the second side, the mobile terminal may display the image 2007 in the lower portion as shown in a third screen 2003. When a touch input is not applied to the second side, the mobile terminal may display the image 2007 on a center as shown in a fourth screen 2004.

A position (or area) in which the image 2007 is displayed may be designated for each position of the touch input in advance. For example, when a position of the touch input corresponds to a first position, a position in which the image 2007 is displayed may correspond to a second position.

The mobile terminal may identify a position of the touch input and display the image 2007 in at least a portion of an area other than the identified position in the second area. For example, the mobile terminal may display the image 2007 in an area corresponding to a size of the image 2007 in the area other than the identified position in the second area.

In response to the position of the touch input being identified, the mobile terminal may restrict (or deactivate) touch input sensing for the identified position. Through this, a situation in which a touch input is unintentionally applied may be prevented so a false operation of the mobile terminal is prevented.

Figure 21:
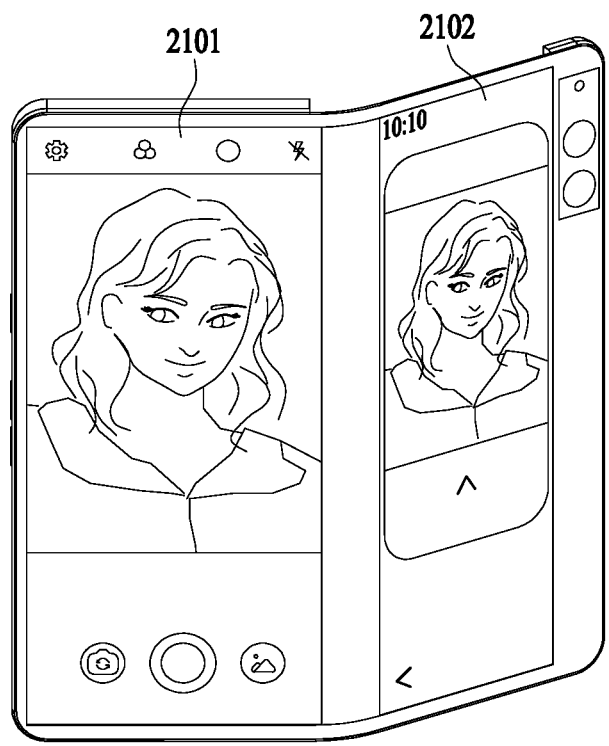
FIG. 21 illustrates a mobile terminal according to an example embodiment of the present disclosure.

FIG. 21 illustrates a mobile terminal according to an example embodiment of the present disclosure. Specifically, FIG. 21 is a diagram for explaining an embodiment of the present disclosure applied in a case in which a mobile terminal is of an out-folding type.

Referring to FIG. 21, a mobile terminal may be folded such that a display is exposed externally. In this case, the display may be divided into one area and another area based on a rotation axis for folding the display. Here, the one area may correspond to a first area and the other area may correspond to a second area. As illustrated, a first screen 2101 may be displayed in the first area and a second screen 2102 may be displayed in the second area.

Figure 22:
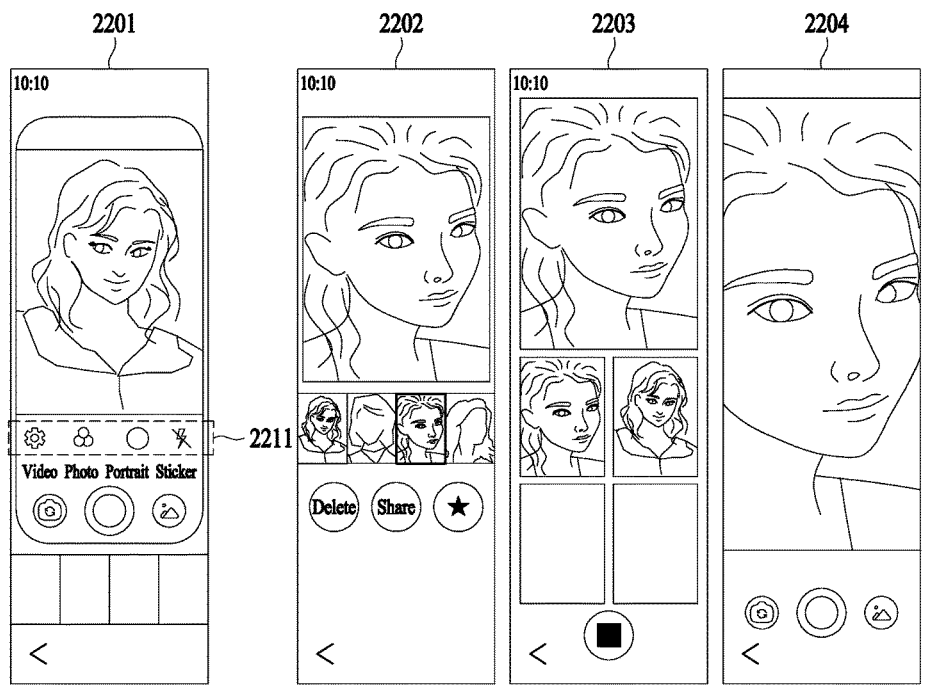
FIGS. 22 and 23 illustrate screens displayed on a second side of a mobile terminal according to an example embodiment of the present disclosure.
Figure 23:
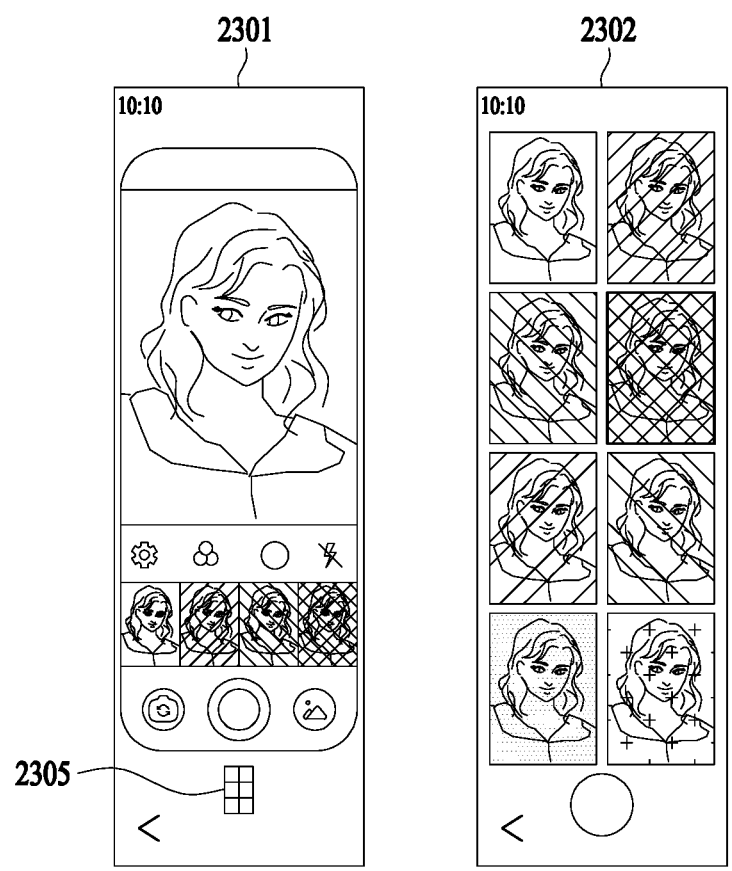

FIGS. 22 and 23 illustrate screens displayed on a second side of a mobile terminal according to an example embodiment of the present disclosure. Specifically, FIGS. 22 and 23 illustrate examples of various screens to be displayed in a second area of the second side. Although the following description is based on a screen displayed on the second side for brevity, embodiments are not limited thereto and the screen may also be displayed on at least a portion of the second side.

A display located at the second side of the mobile terminal may have a vertical ratio greater than a horizontal ratio when compared to a display located at the first side. For example, the display located at the second side may be in a form longer in a longitudinal direction in comparison to the display located at the first side. In this example, the mobile terminal may display an image acquired through a camera and a control icon based on an aspect ratio of the second side.

Referring to FIG. 22, the mobile terminal may display control icons 2211 below an image acquired through a camera as shown in a first screen 2201. Also, as shown in the first screen 2201, a second screen 2202, and a third screen 2203, the mobile terminal may display the image acquired through the camera on the second side (e.g., in a second area of the second side) by reducing the image to correspond to a horizontal length of the second side.

As shown in the second screen 2202, the mobile terminal may display a screen including a portion of control icons displayed on the first side, on the second side based on the size of the second side. For example, the mobile terminal may display a portion of all icons provided by applications (e.g., a camera app) on the second side.

As shown in the third screen 2203, the mobile terminal may display a screen including a previously acquired image and the image acquired through the camera on the second side while omitting provision of control icons. In this case, the image acquired through the camera may be displayed in a first size and the previously acquired image may be displayed in a second size, the second size being less than the first size.

As shown in a fourth screen 2204, the mobile terminal may display a screen including at least a portion of the image acquired through the camera, on the second side based on the size of the second side.

Referring to FIG. 23, the mobile terminal may display a fifth screen 2301 or a sixth screen 2302 on the second side in response to the camera app providing a filter function. Here, the filter function may be to correct settings of an image acquired through a camera and may include a function to store an image by correcting at least one of a brightness, a color, a contrast, and a clearness of the image, for example.

Specifically, along with the image acquired through the camera as shown in the fifth screen 2301, the mobile terminal may provide images representing various filter-applied examples below the acquired image. If an input is applied to an icon 2305 instructing to change a layout, the mobile terminal may display the images of various filter-applied examples by enlarging the images as shown in the sixth screen 2302.

In a mobile terminal and a control method of the mobile terminal of the present disclosure, an image may be provided in each of a first area and a second area so that an image acquired through a camera is viewed by both user of the mobile terminal performing the image capturing and model to be captured. Through this, communication between the user of the mobile terminal and the model to be captured may be smoothly performed. Also, the image capturing may be easily performed, which may lead to an improvement in usability of the mobile terminal.

Also, in the mobile terminal and the control method of the mobile terminal of the present disclosure, a situation in which the user of the mobile terminal views a second side (e.g., a rear side) may be verified based on a sensed pose of the mobile terminal. Through this, a screen may be provided on the second side based on the verified situation, so that the user can more easily use the mobile terminal.

According to example embodiments, it is possible to provide a mobile terminal and a control method thereof to control input sensing for at least one of a front side and a rear side of a display based on a use pattern of the mobile terminal, thereby preventing a false operation which may occur due to an input to the mobile terminal.

According to example embodiments, it is possible to control displaying based on a pose of a mobile terminal and reflect a use pattern of the mobile terminal, thereby improving a usability of the mobile terminal.

Effects are not limited to the aforementioned effects, and other effects not mentioned will be clearly understood by those skilled in the art from the description of the claims.

The above description is merely illustrative of the technical idea of the present disclosure, and those skilled in the art to which the present disclosure pertains can make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

What is claimed is:

1. A mobile terminal comprising:
   a display including a first area and a second area, wherein the first area is located at a first side of the mobile terminal and the second area is located at a second side of the mobile terminal facing the first side;
   a camera disposed on the second side;
   a controller; and
   at least one sensor, wherein the controller is configured to display an image acquired through the camera at the first area and the second area, and wherein the controller is further configured to:

display the image acquired through the camera at the first area and the second area and deactivate touch input sensing for at least a portion of the second area based on information sensed through the at least one sensor corresponding to a first condition; and display the image acquired through the camera at the second area and deactivate touch input sensing for at least a portion of the first area based on the information sensed through the at least one sensor corresponding to a second condition.

2. The mobile terminal of claim 1, further comprising:

a pose sensor, wherein the controller is further configured to display the image acquired through the camera at the second area based on a pose of the mobile terminal sensed by the pose sensor corresponding to a predetermined pose.

3. The mobile terminal of claim 2, wherein the controller is further configured to display the image acquired through the camera at the second area based on an angle between a horizontal plane and a plane corresponding to the second area being less than or equal to a predetermined angle.

4. The mobile terminal of claim 1, wherein the controller is further configured to display the image at the first area and the second area based on the image including a person image.

5. The mobile terminal of claim 1, wherein the controller is further configured to display the image at the first area and the second area based on the image including a person image and a proportion of a size of the person image relative to a size of the image being greater than or equal to a predetermined proportion.

6. The mobile terminal of claim 1, wherein the controller is further configured to activate touch input sensing for a portion of the second area corresponding to a portion displaying a control icon.

7. The mobile terminal of claim 1, wherein the controller is further configured to identify a touch input sensed in the second area and determine a position of an image to be displayed at the second area based on a position of the touch input.

8. The mobile terminal of claim 1, wherein the controller is further configured to:

display a first icon and a second icon at the first area in response to an execution of an application related to the camera;

display the image acquired through the camera at the first area and the second area in response to a touch input to the first icon; and display the image acquired through the camera at the second area in response to a touch input to the second icon.

9. The mobile terminal of claim 1, wherein the controller is further configured to:

display the image acquired through the camera at the first area and the second area in response to a touch input corresponding to the first area; and display the image acquired through the camera at the second area in response to a touch input corresponding to the second area.

10. The mobile terminal of claim 9, wherein at least one of the touch input corresponding to the first area or the touch input corresponding to the second area is received in a state in which at least a portion of functions of an application related to the camera are suspended.

11. The mobile terminal of claim 9, wherein at least one of the touch input corresponding to the first area or the touch input corresponding to the second area includes at least one of a swipe input or a knock-on input.

12. The mobile terminal of claim 1, wherein the controller is further configured to:

display the image acquired through the camera at the first area and the second area in response to a first input to a predetermined physical key; and display the image acquired through the camera at the second area in response to a second input to the predetermined physical key.

13. The mobile terminal of claim 1, wherein the display further includes a third area between the first area and the second area that is configured to be rolled on one side of the mobile terminal and a flexible display including a first area located at the first side of the mobile terminal, wherein a size of the first area of the flexible display is changed in accordance with a control of the controller.

14. The mobile terminal of claim 1, wherein the controller is further configured to further display predetermined content at the first area in response to the image being displayed at the second area.

15. A method of controlling a mobile terminal that comprises a display including a first area and a second area, wherein the first area is located at a first side of the mobile terminal and the second area is located at a second side of the mobile terminal facing the first side and a camera disposed on the second side, the method comprising:

acquiring an image through the camera; and displaying the acquired image at the first area and the second area, wherein the mobile terminal further comprises at least one sensor, and wherein displaying the acquired image comprises:

displaying the image acquired through the camera at the first area and the second area and deactivating touch input sensing for at least a portion of the second area based on information sensed through the at least one sensor corresponding to a first condition; and displaying the image acquired through the camera at the second area and deactivating touch input sensing for at least a portion of the first area based on the information sensed through the at least one sensor corresponding to a second condition.

* * * * *